(12) United States Patent
Huber et al.

(10) Patent No.: US 10,670,081 B2
(45) Date of Patent: Jun. 2, 2020

(54) COUPLING DEVICE

(71) Applicant: SUEDDEUTSCHE GELENKSCHEIBENFABRIK GMBH & CO. KG, Waldkraiburg (DE)

(72) Inventors: Armin Huber, Schoenberg (DE); Marc Brandt, Burgkirchen (DE); Johann Loew, Peterskirchen (DE); Roland Liessel, Waldkraiburg (DE); Wolfgang Orthofer, Ampfing (DE)

(73) Assignee: SUEDDEUTSCHE GELENKSCHEIBENFABRIK GMBH & CO. KG, Waldkraiburg (DE)

( * ) Notice: Subject to any disclaimer, the term of this patent is extended or adjusted under 35 U.S.C. 154(b) by 258 days.

(21) Appl. No.: 15/514,186

(22) PCT Filed: Sep. 15, 2015

(86) PCT No.: PCT/EP2015/071036
§ 371 (c)(1),
(2) Date: Mar. 24, 2017

(87) PCT Pub. No.: WO2016/046019
PCT Pub. Date: Mar. 31, 2016

(65) Prior Publication Data
US 2017/0298994 A1  Oct. 19, 2017

(30) Foreign Application Priority Data

Sep. 25, 2014 (DE) .................. 10 2014 014 490

(51) Int. Cl.
*F16D 3/78* (2006.01)
*F16D 3/62* (2006.01)
(Continued)

(52) U.S. Cl.
CPC .................. *F16D 3/78* (2013.01); *B61C 9/50* (2013.01); *B61F 5/50* (2013.01); *F16D 3/62* (2013.01)

(58) Field of Classification Search
CPC ...... F16D 3/78; F16D 3/62; B61F 5/50; B61F 5/00; B61C 9/50; B61C 9/46
(Continued)

(56) References Cited

U.S. PATENT DOCUMENTS 2,107,689 A * 2/1938 Bugatti ..................... B61C 9/44
105/131
2,846,857 A 8/1958 Hagenlocher
(Continued)

FOREIGN PATENT DOCUMENTS

CN  101178097 A  5/2008
DE  19639304 A1  3/1998
(Continued)

OTHER PUBLICATIONS

International Search Report for International Patent Application No. PCT/EP2015/071036 dated Jan. 4, 2016 (English language translation attached).
(Continued)

*Primary Examiner* — Greg Binda
(74) *Attorney, Agent, or Firm* — Moore & Van Allen, PLLC; Henry B. Ward, III

(57) ABSTRACT

A coupling device is provided for connecting an engine to a transmission of a vehicle, in particular a rail vehicle, said device comprising at least one filament-reinforced articulation device, at least one first flange that is associated with the
(Continued)

engine and at least one second flange that is associated with the transmission, the at least one filament-reinforced articulation device coupling together the first flange associated with the engine and the at least one flange associated with the transmission.

14 Claims, 23 Drawing Sheets

(51) Int. Cl.
    *B61C 9/50*         (2006.01)
    *B61F 5/50*         (2006.01)

(58) Field of Classification Search
    USPC .............................. 464/69, 93–96; 105/131
    See application file for complete search history.

(56) References Cited

U.S. PATENT DOCUMENTS

| | | |
|---|---|---|
| 4,051,784 A | 10/1977 | Ries |
| 4,674,410 A * | 6/1987 | Santanera ................ B61C 9/44 |
| | | 105/131 |
| 7,250,002 B2 * | 7/2007 | Kotsusa .................... F16D 3/78 |
| | | 464/69 |
| 2014/0378234 A1 | 12/2014 | Kleindorfer et al. |

FOREIGN PATENT DOCUMENTS

| | | |
|---|---|---|
| DE | 29808627 U1 | 7/1998 |
| DE | 102011002785 A1 | 7/2012 |
| DE | 102011119936 A1 | 6/2013 |
| DE | 102012002660 A1 | 8/2013 |
| DE | 102012002757 A1 | 8/2013 |
| DE | 102012017332 A1 | 3/2014 |
| EP | 2626580 A2 | 8/2013 |
| SU | 184924 A1 | 7/1966 |
| SU | 1838167 A3 | 8/1993 |
| WO | 2013001480 A2 | 1/2013 |

OTHER PUBLICATIONS

Russian Decision on Grant issued for counterpart Russian Patent Application No. 2017112109/11 (021439) dated Apr. 17, 2019 (English translation attached).

* cited by examiner

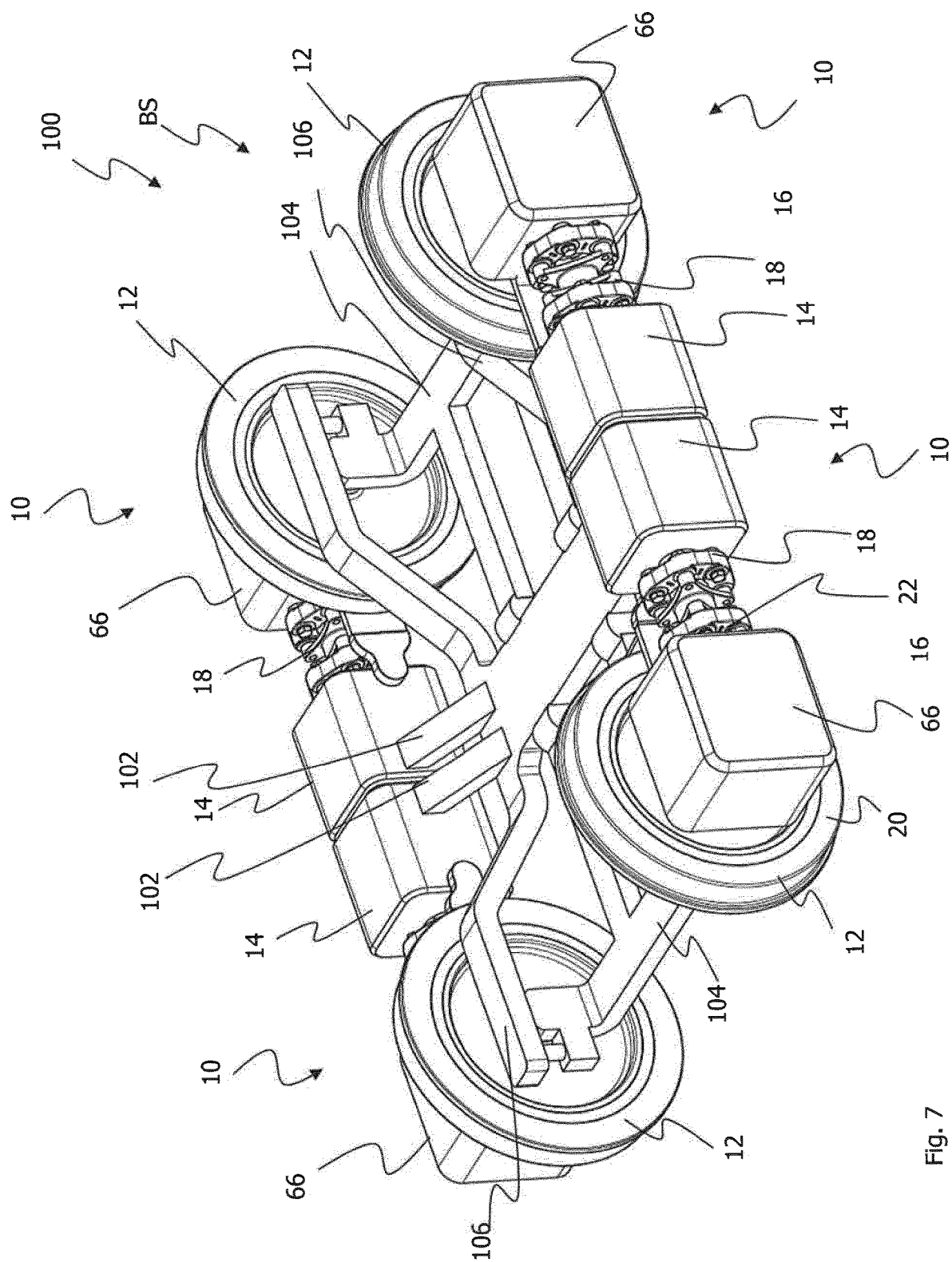

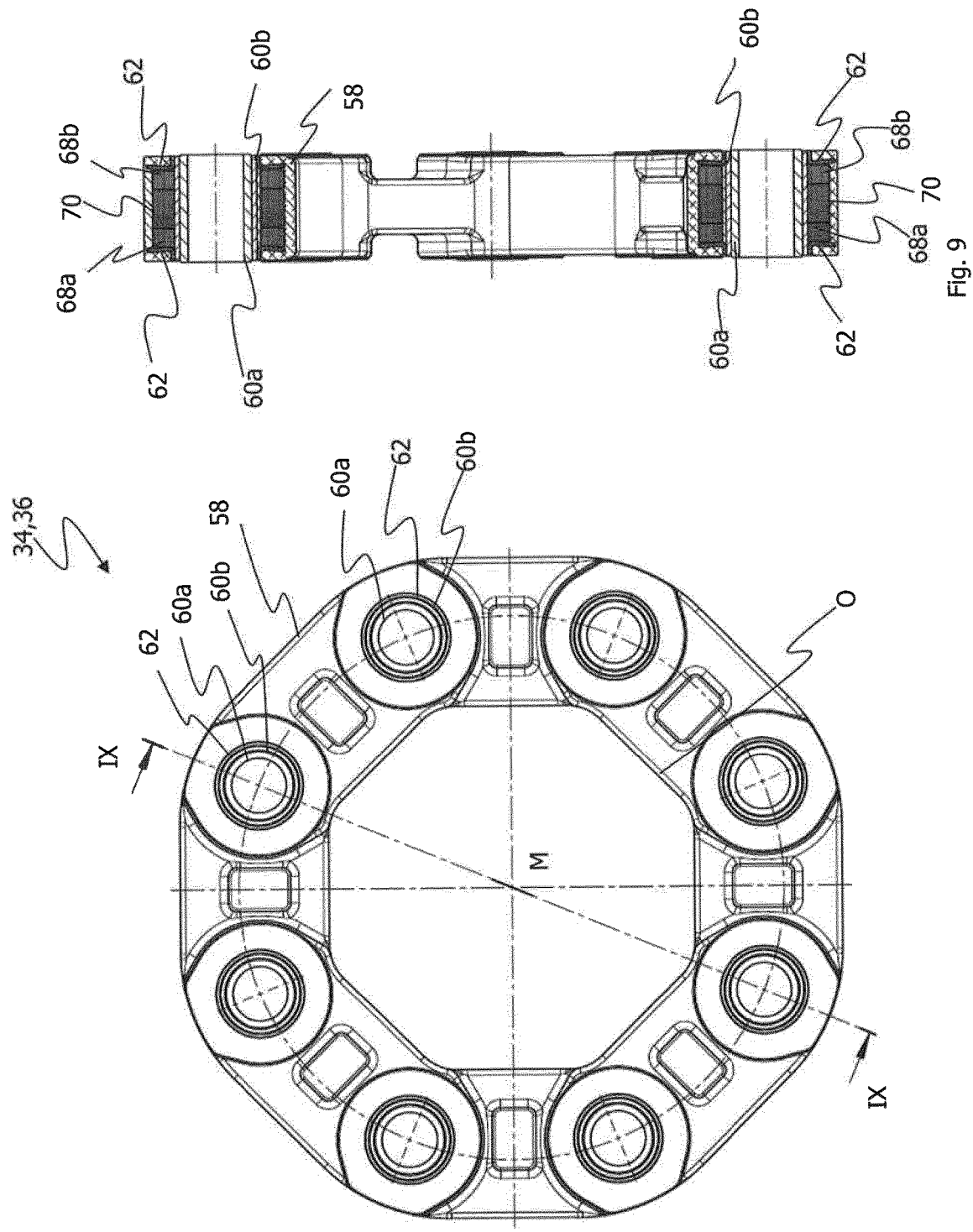

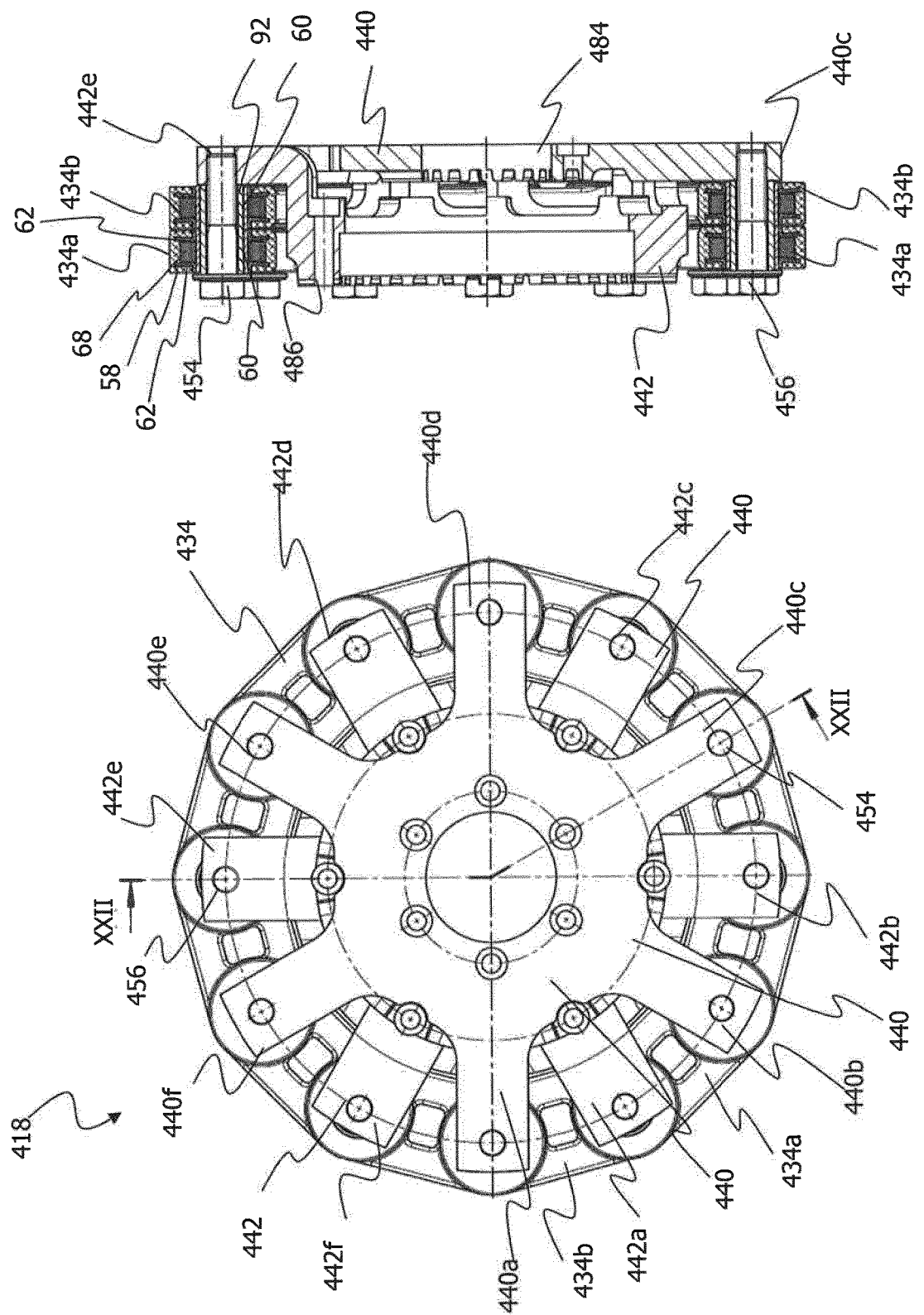

COUPLING DEVICE

FIELD

The present invention relates to a coupling device for connecting a motor to a gear unit of a vehicle, i.e. the coupling device is arranged on the drive side in a vehicle, in particular in a rail vehicle. The term "on the drive side" in this connection means that the coupling device is arranged between the motor output shaft and the gear unit input shaft, thus connects the motor to the gear unit.

BACKGROUND

One field of application of such a coupling device can be, inter alia, low-floor vehicles. In particular, rail vehicles but also busses can be configured in the form of low-floor vehicles. A low-floor vehicle in this connection is to be understood as a vehicle, for example a rail vehicle, the floor of the interior of which is arranged below the upper edge of a wheel of the vehicle. For example, the floor can be provided in the region of half the diameter of the wheel. Low-floor vehicles are intended to allow a barrier-free boarding and deboarding for passengers of the vehicle. Accordingly, a certain drive technology, which can drive the wheels of the vehicle despite the low floors of the interior of the vehicle, is used for such low-floor vehicles. Among other things, special drive arrangements and coupling devices are needed for such low-floor vehicles.

BRIEF SUMMARY OF THE INVENTION

Such coupling devices are also frequently used in rail vehicles having wheel sets. In the field of rail vehicles, curved toothed couplings are mostly used for connecting a motor with a gear unit. Curved toothed couplings are known, for example, from the document DE 29 808 627 U1. Curved toothed couplings are high-maintenance due to their construction and the required oil or grease lubrication. Assembling and disassembling a curved toothed coupling involves high expenditure of time. Due to their tooth systems, curved toothed couplings also generate noise to a considerable extent.

Another coupling device known from prior art is disclosed in the document DE 196 39 304 A1. This document discloses an elastic flexible coupling comprising an intermediate ring arranged between two coupling flanges. The intermediate ring has individual metal elements distributed on the circumference, which are vulcanized into rubber blocks and are alternately screwed together with the coupling flanges. The metal elements of the intermediate ring are composed of wedges which are evenly distributed in the circumferential direction. The wedges extend in the radial direction over the entire width of the ring. In the installed state, rubber blocks vulcanized between the wedges are under compressive preload in the circumferential direction.

Such flexible couplings are relatively difficult to assemble because the rubber blocks have to be radially preloaded in a complex manner during the assembly so as to achieve a compressive preload of the rubber blocks in the mounted state.

It is an object of the present invention to provide a coupling device of the kind designated at the beginning which is low-maintenance and easy to assemble and which enables acoustic decoupling of the aggregates to be connected. It is another object of the present invention to provide a coupling device which is particularly suitable for use on the drive side in a rail vehicle.

These objects are achieved with a coupling device for connecting a motor to a gear unit in a vehicle, in particular a rail vehicle, with the features of a coupling device for connecting a motor to a gear unit of a vehicle, in particular a rail vehicle, comprising at least one first cord-reinforced flexible joint device; at least one first flange that is associated with the motor and at least one second flange that is associated with the gear unit, wherein the at least one cord-reinforced flexible joint device couples to one another the first flange associated with the motor and the second flange associated with the gear unit, wherein the at least one cord-reinforced flexible joint device is configured in the form of an elastic flexible coupling disc, wherein the elastic flexible coupling disc comprises an elastic body; a plurality of linkage elements which are arranged in the circumferential direction in predetermined angular distances with respect to a center axis of the flexible joint device; a plurality of cord packages, wherein each cord package wraps around in each case two adjacent linkage elements and each linkage element is wrapped around by at least two cord packages; and a support device for axially guiding the plurality of the cord packages, which support device is arranged on at least one of the linkage elements, wherein the cord packages, the support devices and the linkage elements are at least partially embedded in the elastic body.

Further embodiments of the invention are specified in the dependent claims.

The coupling device according to the invention for connecting a motor to a gear unit of a vehicle, in particular a rail vehicle, comprises at least one cord-reinforced flexible joint device, at least one first flange that is associated with the motor and at least one second flange that is associated with the gear unit. The at least one cord-reinforced flexible joint device couples to one another the first flange associated with the motor and the second flange associated with the gear unit.

By using at least one cord-reinforced flexible joint device, assembling the coupling device according to the invention can be simplified.

Due to the at least one cord-reinforced flexible joint device, rubber pieces which have to be under compressive preload in the circumferential direction in the installed state can be omitted. The at least one cord-reinforced flexible joint device can be connected without preload to the flanges to be connected and thereby establish a torque-transmitting connection between a motor and a gear unit of a rail vehicle. Furthermore, due to the at least one cord-reinforced flexible joint device, lower mounting forces are needed. The reason for this is that in the case of the coupling device according to the invention, in contrast to the prior art, the relaxation of the rubber blocks, which has not yet occurred completely at the time of assembling, can be disregarded and accordingly does not have to be compensated.

With the coupling device according to the invention, which has at least one cord-reinforced flexible joint device, all of the disadvantages of a curved toothed coupling described at the beginning can be eliminated, i.e., the coupling device according to the invention requires less maintenance, is easier to assemble and quieter than the known curved toothed couplings. Furthermore, and additionally, the coupling device according to the invention needs no oil or grease lubrication. Another advantage of the coupling device according the invention over the curved toothed coupling is that the coupling devices according to the invention are torsionally more flexible due to the cord-reinforced flexible joint device. In contrast, the curved toothed couplings known from prior art are torsionally very rigid. In the case of a short-circuited motor, a very high moment builds up due to the mass inertia of the wheel or wheel set, which can damage the gear unit. For this reason, curved toothed couplings have to be installed in most cases in combination with a friction clutch as a torque limiter. In the case of the coupling device according to the invention having at least one cord-reinforced flexible joint device, the drive train can twist due to the torsional flexibility of the coupling device or the cord-reinforced flexible joint device. Therefore, even in the case of a short circuit in the motor, only a low moment builds up, which cannot damage the gear unit.

Since the at least one flexible joint device is cord-reinforced, the coupling devices according to the invention have a higher power density compared with the prior art. The cord reinforcement of the flexible joint devices results in increased tensile strength so that with identical strength design, a considerably smaller installation space is needed for the cord-reinforced flexible joint device and thus for the coupling devices as a whole.

A cord-reinforced flexible joint device is in particular necessary so as to be able to reduce the unsprung masses at the wheel or wheel set of the vehicle. For this purpose, the motor is arranged or mounted elastically on a vehicle frame or, in the case of a rail vehicle, a bogie. Due to the elastic mounting of the motor, relative movements between the motor and the wheel/wheel set or relative movements between the motor and the gear unit can occur. These relative movements between the elastically mounted motor and the wheel or the wheel set must be compensated. For compensating these relative movements, the at least one cord-reinforced flexible joint is used.

The coupling device according to the invention is particularly suitable for use on the drive side in a rail vehicle, i.e., the coupling device can be used for connecting a motor to a gear unit of a rail vehicle. Accordingly, the at least one first flange and the at least one second flange can in particular be configured for connecting to a motor output shaft and a gear unit input shaft of a rail vehicle.

Due to the arrangement of a coupling device between the motor and the gear unit, the coupling device according to the invention is arranged on the drive side.

According to an embodiment of the invention, the at least one cord-reinforced flexible joint device can comprise at least one link-shaped cord package for torque transmission. The link-shaped cord package can serve for torque transmission between the flange associated with the motor and the second flange associated with the gear unit. The cord packages can be composed of an individual cord wound in a link-shaped manner or of a plurality of individual cords wound in a link-shaped manner.

The at least one cord-reinforced flexible joint device can comprise at least one driven and at least one driving linkage element. The at least one driven and the at least one driving coupling element can be connected or coupled to one another via at least one link-shaped cord package, for example. A link-shaped cord package can wrap around a driven and a driving linkage element and in this manner transmit the torques between these two linkage elements. For example, the coupling elements can be bushings or similar elements. The coupling elements in turn can be connected to one of the flanges or the wheel of the vehicle via, for example, pins or similar connecting elements.

The at least one cord-reinforced flexible joint device can comprise at least one elastic body. The at least one cord package and the coupling elements can be embedded at least in sections in the at least one elastic body. The elastic body serves, inter alia, for absorbing compressive forces which can occur during torque transmission when the coupling device is in operation. In this connection, the at least one cord-reinforced flexible joint device can be formed from a plurality of elastic coupling bodies, each of which has at least one cord package. In other words, a plurality of elastic bodies is connected to one another so as to form the cord-reinforced flexible joint device and to be able to transmit torques between the flanges and the vehicle wheel to be driven. The cord reinforcement limits the elongational strains in the at least one elastic body. Thereby, undesired relaxation occurrences in the at least one elastic body are further reduced.

Furthermore, according to an embodiment, the at least one cord-reinforced flexible joint device can have a plurality of link-shaped cord packages. The link-shaped cord packages can be arranged annularly and in each case connected to one another via at least one coupling element. For example, a coupling element can be connected to two link-shaped cord packages, wherein one of the cord packages is in each case subjected to tension and the other one is arranged in the compression path. The elastic bodies can be made from an elastomer, a thermoplastic elastomer, a polymer or rubber, for example.

According to an embodiment of the invention, at least one first cord-reinforced flexible joint device for coupling to at least one first flange associated with the motor and at least one second cord-reinforced flexible joint device for coupling to a second flange associated with the gear unit can be arranged. The at least one first cord-reinforced flexible joint device and the at least one second cord-reinforced flexible joint device are connected to one another via at least one connection flange arrangement. The at least one first cord-reinforced flexible joint device can serve for torque transmission between the flange associated with the motor and the at least one connection flange arrangement. Furthermore, the at least one second cord-reinforced joint device can serve for transmitting torques between the at least one connection arrangement and the flange associated with the gear unit. Coupling device according to this embodiment are frequently used on the drive side of rail vehicles having wheel sets.

According to one embodiment of the invention, the at least one connection arrangement can comprise at least one shaft section. The at least one shaft section can extend between at least two connection flanges. The at least two connection flanges can each be associated with one of the first and second cord-reinforced joint devices.

According to an embodiment, the at least one connection arrangement can comprise at least one disc-shaped connection element. The at least one disc-shaped connection element can couple to one another the first cord-reinforced flexible joint device and the at least one second cord-reinforced flexible joint device. The at least one disc-shaped connection element can be formed such, that the at least one disc-shaped connection element can be detached from the first cord-reinforced flexible joint device and the at least one second cord-reinforced flexible joint device and can be removed in the radial direction. In order to allow this radial removal, the at least one disc-shaped connection element is formed without undercuts or the like. The at least one disc-shaped connection element requires little installation space in the axial direction due to its disc shape. The axial extent of the at least one disc-shaped connection element can substantially correspond to the axial extent of the flange sections of the first and second flanges. Due to the at least one disc-shaped connection element, the coupling device as a whole requires relatively little installation space in the axial direction. Furthermore, due to the at least one disc-shaped connection element or due to the low mass of the disc-shaped connection element, imbalances at high revolutions can be reduced.

The at least one disc-shaped connection can extend perpendicular to the center axis of the coupling device.

The at least one disc-shaped connection element can have at least on connector piece for coupling to the at least one first cord-reinforced flexible joint device and the at least one second cord-reinforced flexible joint device. On each axial side of the at least one disc-shaped connection element, at least one connector piece can be provided. The at least one connector piece can also be formed integrally with the at least one disc-shaped connection element. An opening that serves for connecting to the first and second cord-reinforced flexible joint devices may extend through the connector pieces arranged on both sides of the at least one disc-shaped connection element. The opening can be a through-opening that extends through the at least one disc-shaped connection element. In this through-opening, fasteners can be inserted from both sides of the disc-shaped connection element and connect in each case the first and the second cord-reinforced flexible joint devices to the disc-shaped connection element. Furthermore, the at least one connector piece can also serve to establish a predetermined spacing between the disc-shaped connection element and one of the cord-reinforced flexible joint devices.

The at least one disc-shaped connection element may comprise, for example, four connection positions for connecting to the first and the second cord-reinforced flexible joint devices.

The at least one connection arrangement may comprise at least one spacer. The at least one spacer can set a predetermined spacing between the at least one connection arrangement and at least one of the first and second cord-reinforced flexible joint devices. The at least one spacer can be formed integrally with the connection flange arrangement. Furthermore, the at least one spacer can be provided on one of the two connection flanges and can serve for connecting to at least one of the two cord-reinforced flexible joint devices. For example, the cord-reinforce flexible joint devices can be screwed to the connection arrangement via the spacers. Furthermore, the connection flanges can be formed substantially triangular or can be three-arm flanges.

The at least one cord-reinforced flexible joint device can be configured in the form of an elastic flexible coupling disc. An elastic flexible coupling disc can comprise a plurality of linkage elements which are arranged in the circumferential direction at predetermined angular distances with respect to a center axis of the flexible joint device, a plurality of cord packages, wherein each cord package wraps in each case around two adjacent linkage elements, and each linkage element is wrapped around by two cord packages, a support device for axially guiding the plurality of cord packages, which support device is arranged on one of the linkage elements, and an elastic sheathing in which the cord packages, the support device and the linkage elements are at least partially embedded. The support device can include at least two separately formed collar elements that can be attached on one of the linkage elements.

Furthermore, the at least one flexible joint device can be formed from a plurality of coupling elements that are coupled to one another. Each coupling element comprises an elastic body, in which at least one cord package is embedded which wraps around two linkage elements.

According to an embodiment of the invention, another flange, in addition to the at least one first flange and the at least one second flange, can be connected to the at least one cord-reinforced flexible joint device. This embodiment allows to couple a plurality of output drives or drives to one another via a cord-reinforced flexible joint device. For example, the first flange can be associated with a drive, wherein the second and the at least one further flange can each be associated with an output drive. In this case, the second flange and the at least one further flange can be provided on the same axial side of the at least one cord-reinforced flexible joint device and can be driven with the first flange, which is coupled to a drive, via the at least one cord-reinforced flexible joint device.

According to an embodiment of the invention, the at least one first flange and the at least one second flange can be arranged on the same axial surface of the at least one cord-reinforced flexible joint device. Thereby, the installation space of the coupling device in the axial direction can be further reduced because the axial installation space of one of the flanges can be saved. For example, one of the two flanges can extend, at least in sections, through an opening formed in the at least one cord-reinforced flexible joint device. Also, it is conceivable that one of the two flanges extends around the cord-reinforced flexible joint device. In case of a failure of the first and second flexible joint device, the first and the second flanges mutually form an anti-slip protection, i.e., the first and the second flange form a stop for the respective other flange.

The present invention further relates to a drive arrangement for a vehicle, in particular a rail vehicle, with the features of a drive arrangement for a vehicle, in particular for a rail vehicle, the drive arrangement comprising at least one motor; and at least one gear unit that is associated with at least one vehicle wheel to be driven, wherein a coupling device as disclosed herein, which connects to one another a first flange associated with the at least one motor and a second flange associated with the at least one gear unit.

The drive arrangement comprises at least one motor and at least one gear unit that is associated with a vehicle wheel to be driven. The drive arrangement further comprises a coupling device of the above described kind, which connects to one another a first flange associated with the at least one motor and a second flange associated with the at least one gear unit.

In other words, the coupling device establishes a torque-transmitting connection between the motor and the gear unit associated with the vehicle wheel. In detail, the coupling device establishes a torque-transmitting connection between a motor output shaft and a gear unit input shaft.

According to an embodiment, the rotation axis of the at least one coupling device extends in the same direction as the rotation axis of the input shaft of the gear unit. Furthermore, the rotation axis of the motor output shaft can also run in the same direction as the rotation axes of the at least one coupling device and the at least one input shaft of the gear unit. In contrast to that, the rotation axis of the vehicle wheel to be driven runs perpendicular to the rotation axes of the input shaft of the gear unit, the coupling device and the output shaft of the motor.

According to an embodiment, the drive arrangement has at least one holder in which the at least one input shaft of the gear unit can be mounted.

The invention aims at a use of at least one cord-reinforced flexible joint device in a drive arrangement for a vehicle, in particular a rail vehicle, wherein the at least one cord-reinforced flexible joint device can be provided between the motor and the gear unit arranged at the vehicle wheel.

The present invention further relates to a rail vehicle having at least one drive arrangement according to the above described kind.

BRIEF DESCRIPTION OF THE SEVERAL VIEWS OF THE DRAWINGS

In the following, an exemplary embodiment is described with reference to the accompanying figures. In the figures:

FIG. 7 shows the perspective view according to FIG. 1 with housings arranged on the gear units;

FIG. 8 shows a top view of an elastic flexible joint device according to the invention;

FIG. 9 shows a sectional view along the section line IX-IX in FIG. 8;

FIG. 21 shows a top view of the coupling device according to the fifth embodiment of the invention;

FIG. 22 shows a sectional view along the section line XXII-XXII in FIG. 22;

DETAILED DESCRIPTION OF EMBODIMENTS OF THE INVENTION

Figure 1:
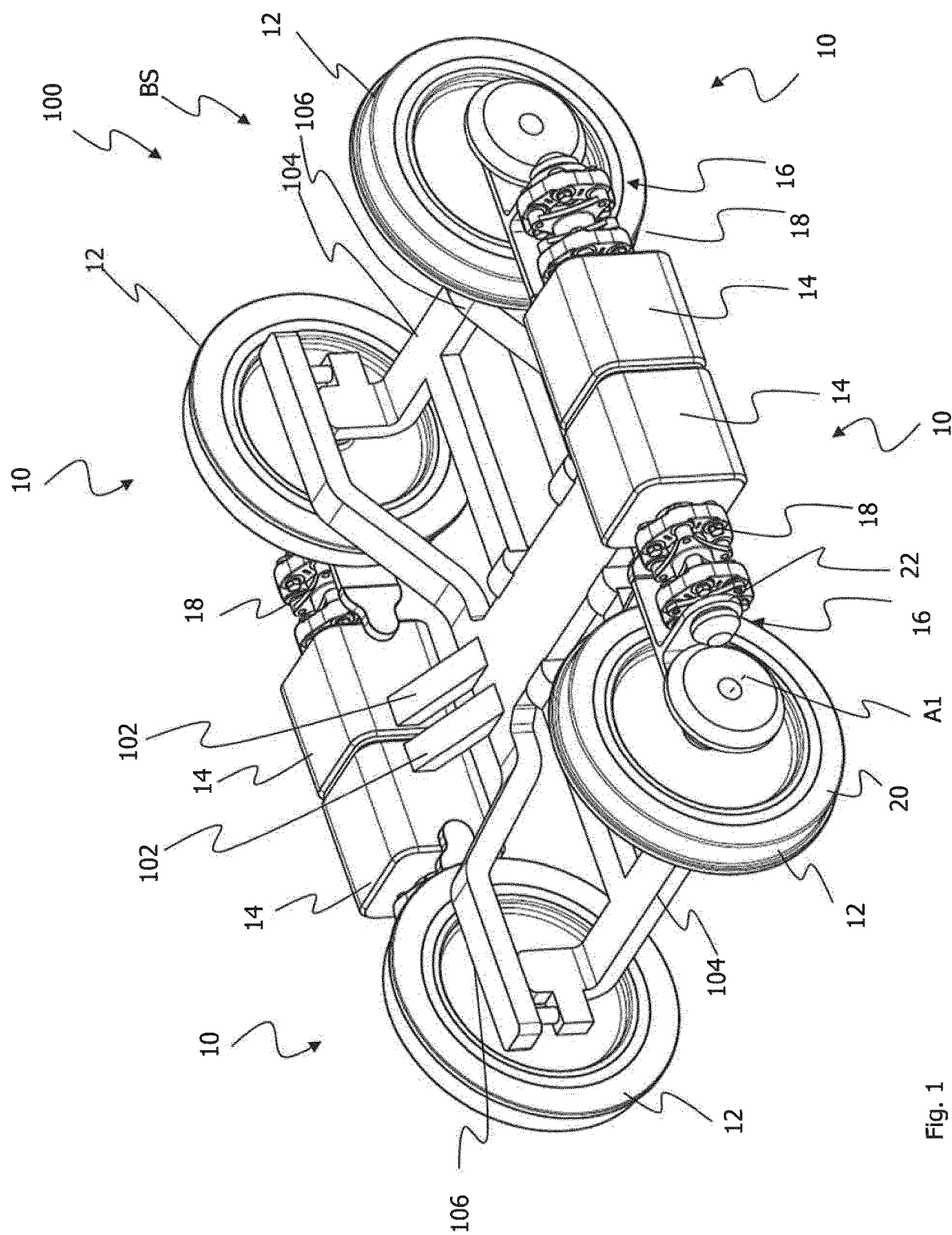
FIG. 1 shows perspective view of an undercarriage with a drive arrangement according to the invention arranged thereon.

FIG. 1 shows a perspective view of an undercarriage 100 of a rail vehicle. The undercarriage can be a bogie of a rail vehicle, for example. Four drive arrangements 10 are arranged on the bogie 100.

Each drive arrangement 10 is associated with a rail vehicle wheel 12 and comprises a motor 14, a gear unit 16 and a coupling device 18. The coupling device 18 is connected to the gear unit 16. The gear unit 16 is arranged on the side 20 of the rail vehicle wheel 12 facing away from the undercarriage 100. The coupling device 18 is directly connected to the motor 14 and the gear unit 16, i.e., the coupling device 18 is provided between the gear unit 16 and the motor 14 and thus arranged on the drive side. In this case, only the motor 14 is spring-mounted. Accordingly, the motor 14 is part of the sprung mass. In this case, this is also referred to as a partially spring-mounted system.

The drive arrangement 10 further comprises a holder 22 that holds the gear unit 16 and the coupling device 18 so that a torque-transmitting connection between the motor 14 and the gear unit 16 can be established via the coupling device 18.

The motors 14 are attached to the undercarriage 100 via connection elements 102. The rail vehicles wheels 12 are connected to the undercarriage 100 by means of cross beams 104 and longitudinal beams 106. Sections of the cross beams 103 and the longitudinal beams 106 are situated below the axes A1 of the wheels 12. This is characteristic for low-floor vehicles because this makes it possible to arrange the inner floors of the vehicles below the axes A1 or in the region of the axes A1. The drive arrangements 10 are arranged outside of a region BS of the undercarriage 100 that is enclosed between the rail vehicles 12. The region BS is defined by the cross beams 104 and the longitudinal beams 106 of the undercarriage 100. The drive arrangements 10 are provided on the side 20 of the wheels 12 that faces away from the undercarriage 100.

Figure 2:
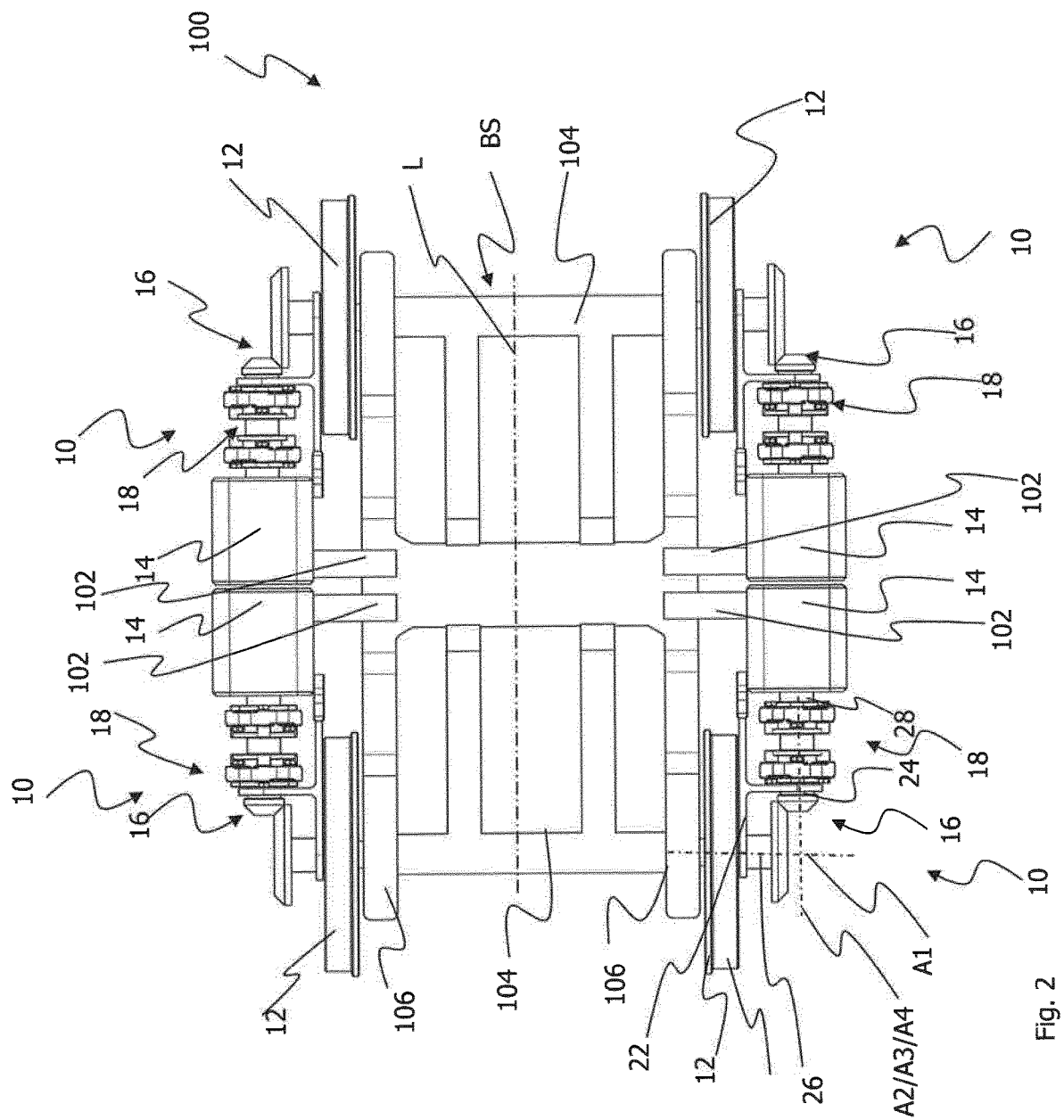
FIG. 2 shows a top view of the vehicle undercarriage with the drive arrangement according to the invention arranged thereon.

In FIG. 2, a top view of the undercarriage 100 with the drive arrangements 10 arranged thereon is shown.

The gear unit 16 is configured in the form of a bevel gear and has a gear unit input shaft 24 and a gear unit output shaft 26. The coupling device 18 establishes a torque-transmitting connection between a motor output shaft 28 and the gear unit input shaft 24.

In the axial direction of the axes A1 of the rail vehicle wheels 12, the drive arrangements 10 are arranged outside of the region BS on the side 20 of the wheels 12. The holder 22 serves for mounting the gear unit input shaft 24 and the gear unit output shaft 26 through which a torque-transmitting connection between the gear unit 16 and the rail vehicle 12 is established. The rotation axes A2, A3 and A4 of the motor output shaft 28, the coupling device 18 and the gear unit input shaft 24 extend in the idle state of the coupling device 18 in the same direction, i.e. parallel to the longitudinal axis L of the undercarriage 100, and congruent.

The axis A1 of the rail vehicle, however, extends perpendicular to the axis A2, A3 and A4 of the motor output shaft 28, the coupling device 18 and the gear unit input shaft 24.

Figure 3:
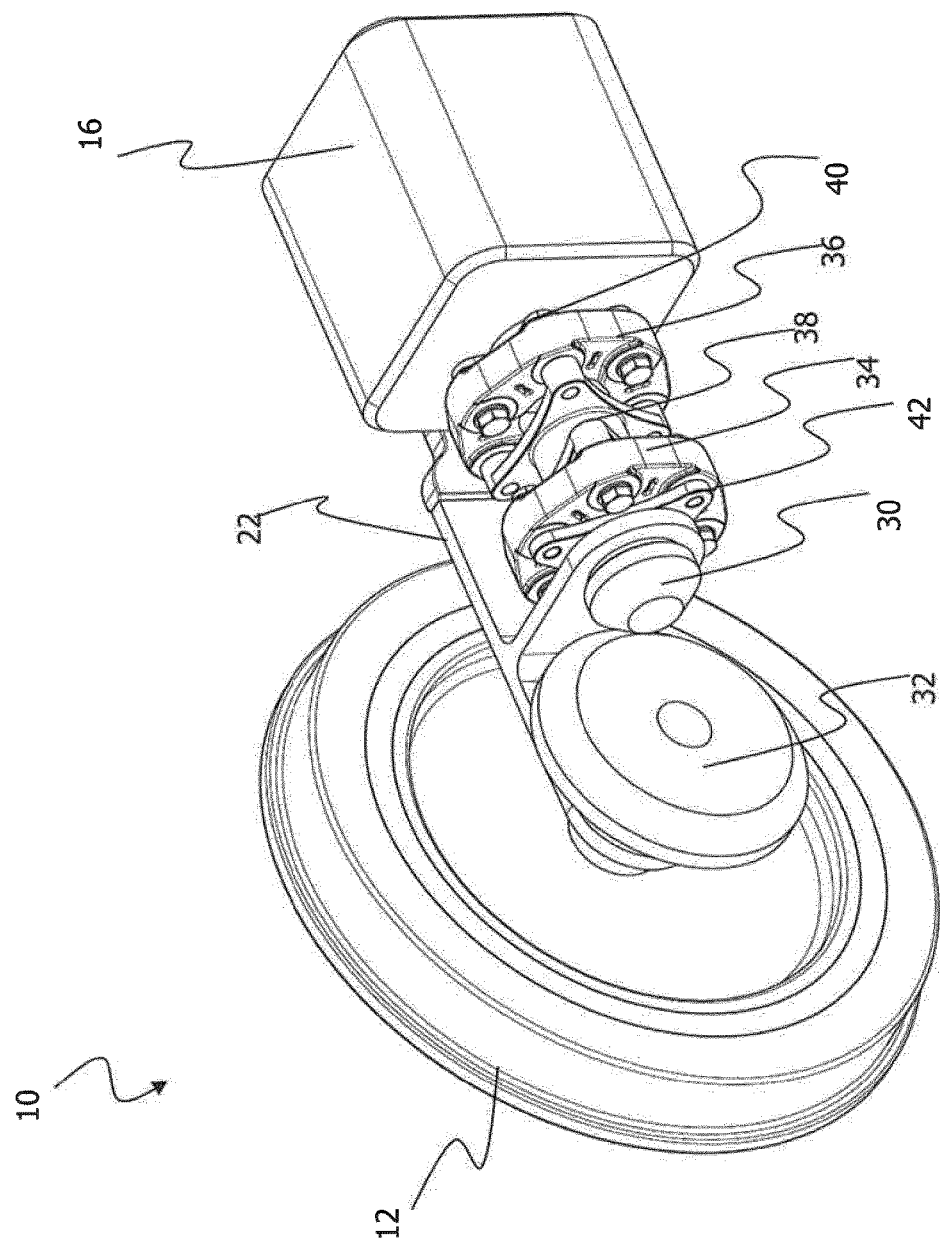
FIG. 3 shows a perspective view of the drive arrangement according to the invention.

FIG. 3 shows a perspective view of the drive arrangement 10.

The motor 14 or its motor output shaft 28 is connected to the coupling device 18 in a torque-transmitting manner. The coupling device 18 transmits the torque generated by the motor 14 to the gear unit input shaft 24 of the gear unit 16. For this purpose, a cone-shaped or conically formed pinion 30 is provided which transmits the torque to a crown gear 32 of the gear unit 20. The axis A2/A3/A4 of the gear unit input shaft 24 with the pinion 30 arranged thereon and the axis A1 of the rail vehicle 14 or of the crown gear 32 are offset to one another by 90 degrees (see FIG. 4).

The coupling device 18 has two cord-reinforced flexible joint devices 34 and 36 that are configured in the form of an elastic flexible coupling disc. However, it would also be conceivable to use a cord-reinforced flexible joint device which is formed from a plurality of coupling links, i.e. a plurality of rubber bodies having cord packages embedded therein.

The cord-reinforced flexible joint devices 34 and 36 are connected via a connection flange arrangement 38 with which the cord-reinforced flexible joint devices 34 or 36 can be screwed together. The motor output shaft 28 has a flange 40 that is connected to the cord-reinforced flexible joint device 36. Similarly, the gear unit input shaft 24 has a flange 42 which is screwed together with the cord-reinforced flexible joint device.

Figure 4:
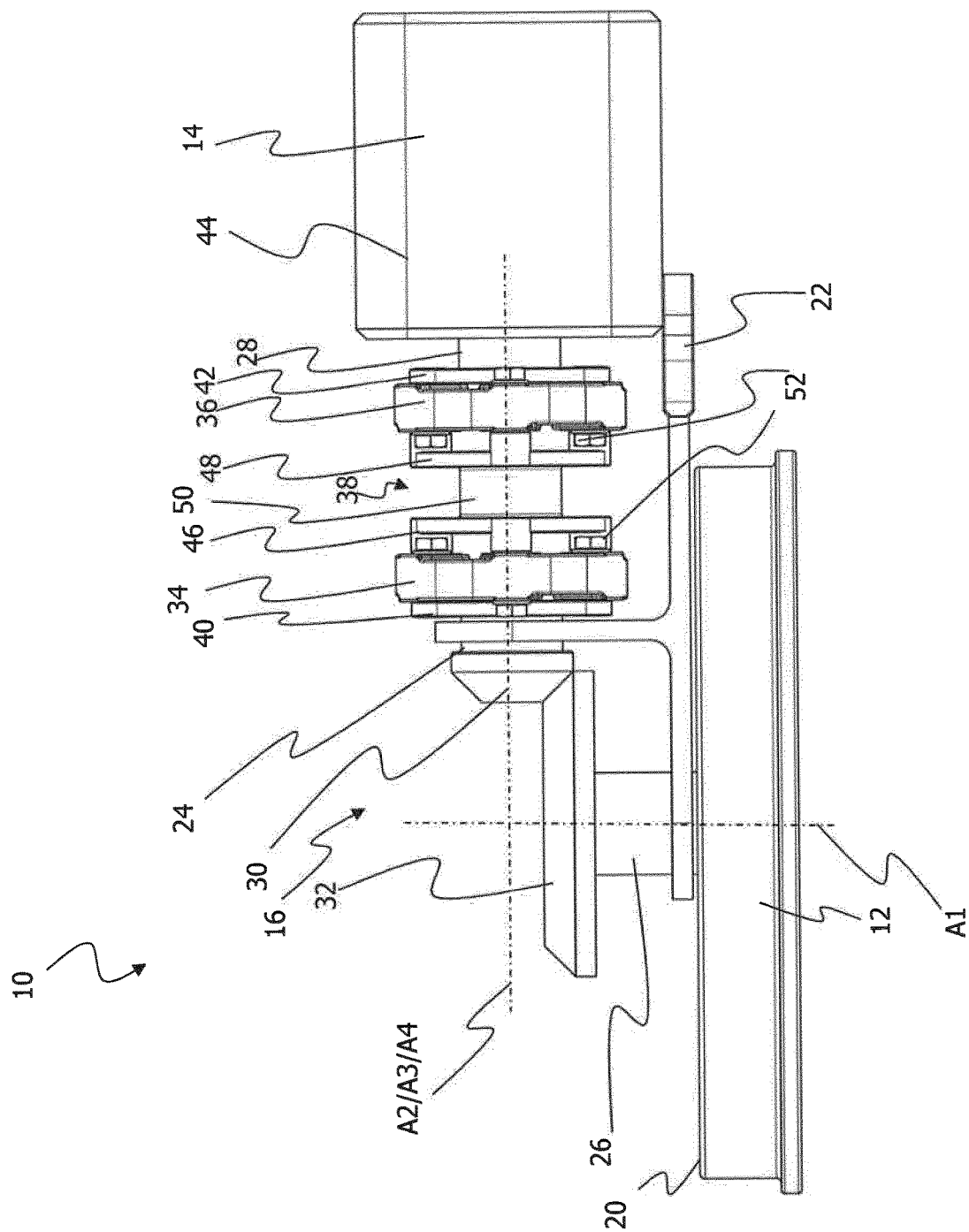
FIG. 4 shows a top view of the drive arrangement according to the invention.

FIG. 4 shows a top view of the drive arrangement 10.

The holder 22 mounts the gear unit input shaft 24 and the gear unit output shaft 26 and is connected to a housing 44 of the motor 14. The coupling device 18 is provided between the motor 14 and the gear unit 16 and thus is arranged on the drive side. The holder 22 is configured in a substantially T-shaped manner. The gear unit input shaft 24 and the gear unit output shaft 26 extend through the holder 22 and are mounted in the holder 22.

The connection flange arrangement 38 has a first flange 46 and a second flange 48 which are connected to one another via a shaft section 50. Spacers 52 which set a predetermined spacing to the cord-reinforced flexible joint devices 34 and 36 can be formed on the flanges 46 and 48.

The rotation axes A2, A3 and A4 of the motor output shaft 28, the coupling device 18 and the gear unit input shaft 24 extend in the idle state of the coupling device 18 in the same direction and are congruent and thus perpendicular to axis A1 of the wheel 12 or the gear unit output shaft 26.

Figure 5:
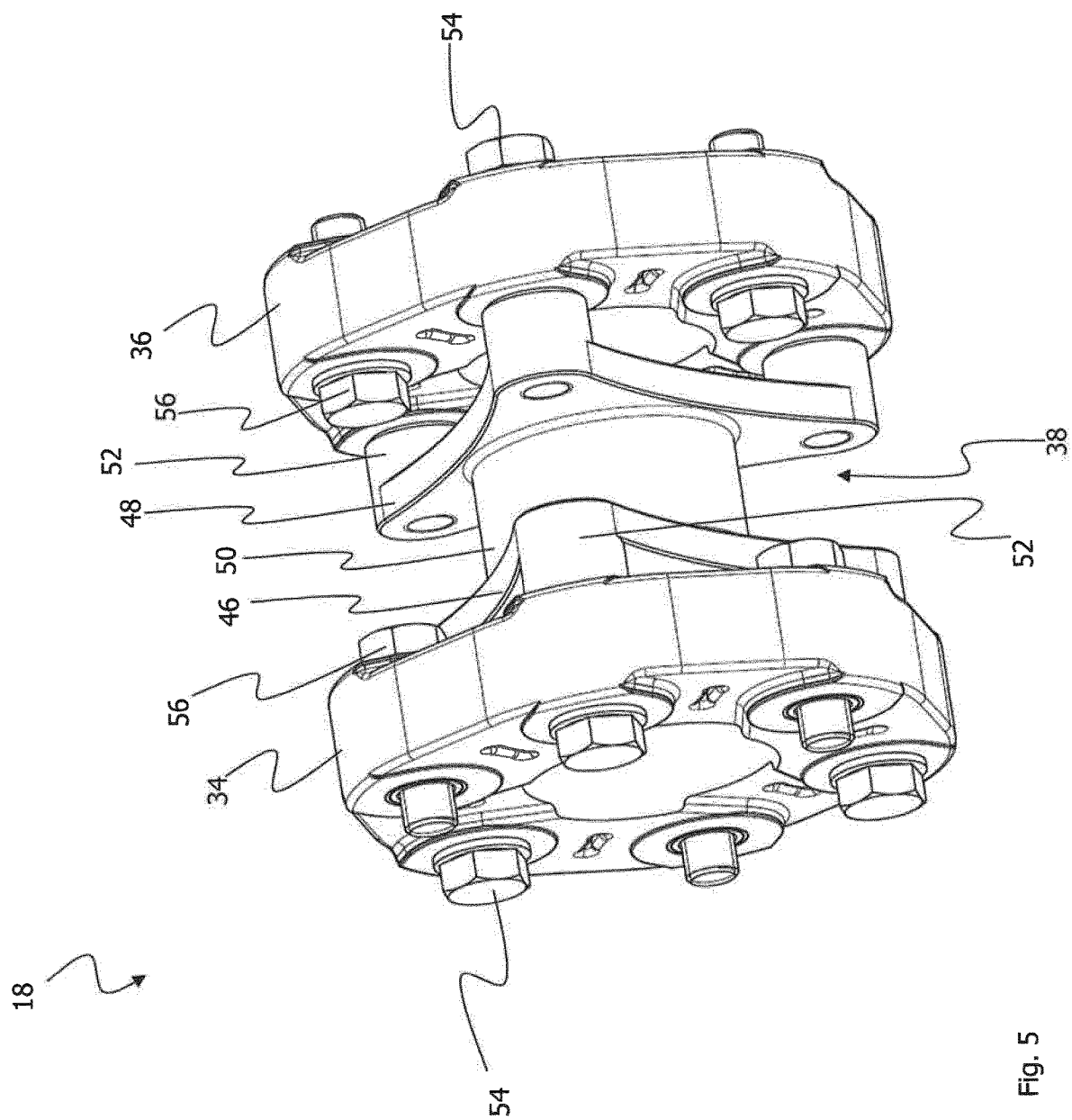
FIG. 5 shows a perspective view of a coupling device according to a first embodiment of the invention.

FIG. 5 shows a perspective view of the coupling device 18 having the cord-reinforced flexible joint device 34 and the cord-reinforced flexible joint device 36, both of which are configured in the form of an elastic flexible coupling disc.

The connection flange arrangement 38 with its flanges 46 and 48, which are connected to one another via a shaft section 50, extends between the cord-reinforced flexible joint devices or the flexible coupling discs 34 and 36. The flanges 46 and 48 each have spacers 52 which serve for connecting the flanges 46, 48 to the flexible coupling discs 34, 36. The elastic flexible joint devices 34 and 36 are connected to the flange arrangement 38 or to the flanges 46, 48 and the spacers 52 thereof via screws 54. Similarly, the cord-reinforced flexible joint devices 34 and 36 can be screwed together with the flanges 40, 42 (not shown in FIG. 5) of the motor output shaft 28 and the gear unit input shaft 24 by means of the screws 56. The flanges 46 and 48 can be three-arm flanges or can be formed substantially triangular.

Figure 6:
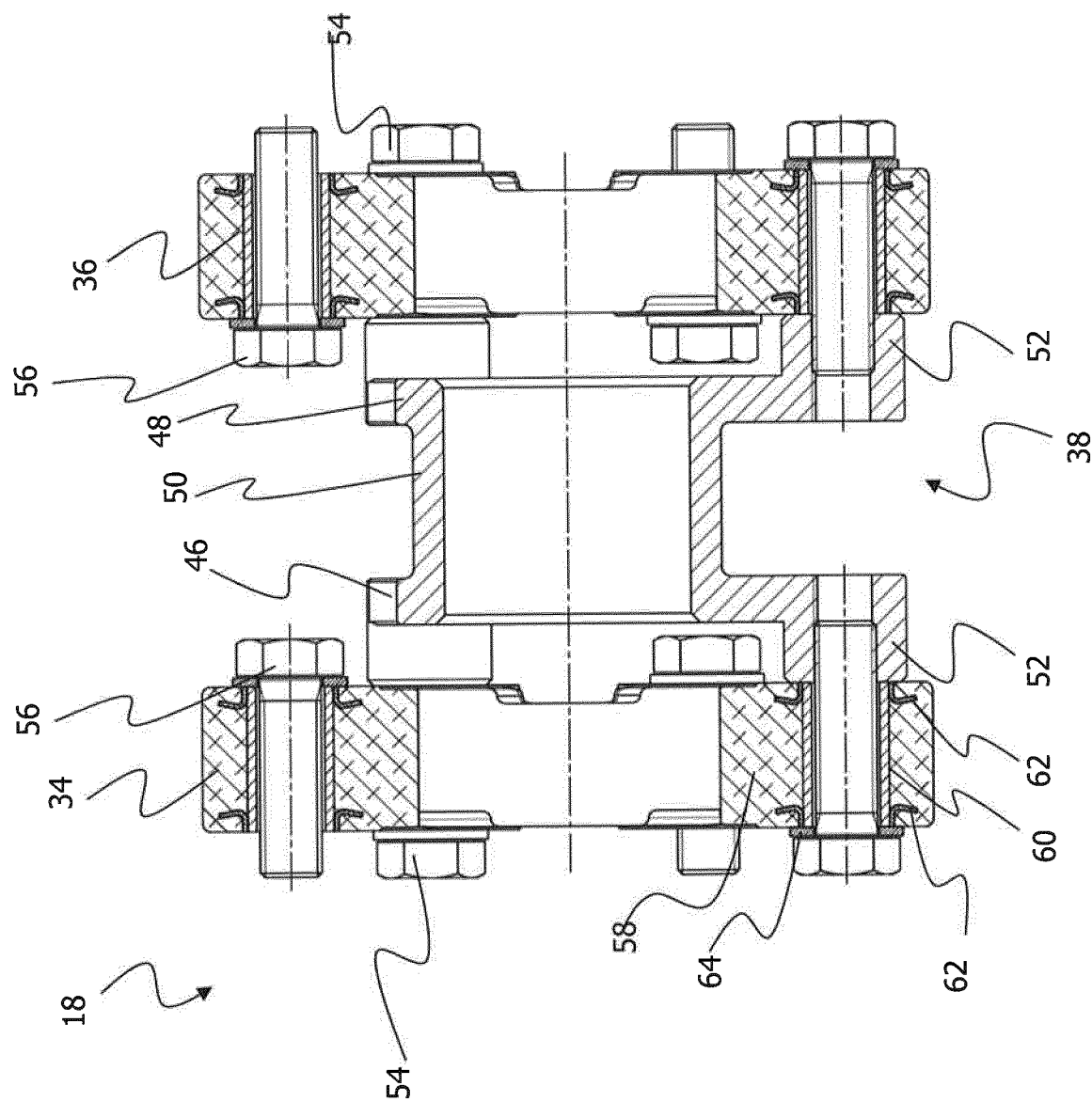
FIG. 6 shows a sectional view of the coupling device according to the first embodiment of the invention.

FIG. 6 shows a sectional view of the coupling device 18.

The shaft section 50 of the connection flange arrangement 38 is configured in the form of a hollow shaft section. The spacers 52 are formed integrally with the flanges 46 and 48.

The cord-reinforced flexible joint devices 34 and 36, which are each configured in the form of a flexible coupling disc, have an elastic body 58 in which a plurality of cord packages are embedded, which are not shown in FIG. 6. The cord packages, in each case in pairs, wrap around the linkage elements 60 so that a torque can be transmitted via tension paths of the cord packages. The screws 54 and 56 extend through the linkage elements 60. In a comparable view of the FIGS. 4 and 6 it is apparent that the screws 56 are connected on the drive side to the flange 40 of the motor output shaft 28. The screws 56 are connected to the flange 42 of the gear unit input shaft 24 and thus are arranged on the drive side. The torque is transmitted from the flange 40 to the flexible coupling disc 36 and from there via the flanges 46 and 48 of the connection flange arrangement 38 to the flexible coupling disc 34. From the flexible coupling disc 34, the torque is transmitted to the flange 42 of the gear unit input shaft 24 and thus to the gear unit 16. The gear unit 16 drives the wheel 12 by means of the gear unit output shaft 26.

The cord packages, which are not shown, each wrap around linkage element 60 associated with the screws 54 and a linkage element 60 associated with the screws 56 so that a torque can be transmitted via the cord packages and the rubber body 58. Collar elements 62 are provided at the axial ends of the linkage elements 60. The collar elements 62 are configured in the form of collars having an L-shaped cross-section and serve for securing the cord packages, which are not shown, on the linkage elements 60. Furthermore, between the screw head of the screws 54 and 56 there is provided a washer 64 which establishes the contact to the linkage elements 60.

The torque is transmitted from the motor 14 to the coupling device 18. From the coupling device 18, the torque is transmitted to the gear unit 16 that is associated with a rail vehicle wheel 12 or is connected to this wheel via the gear unit output shaft 26. The coupling device 18 serves for compensating relative movements between the motor 14 and the gear unit 16 and for compensating offsets between the axes A2/A3/A4.

FIG. 7 shows a perspective view of the undercarriage 100 of the rail vehicle with the four drive arrangements 10.

The view according to FIG. 7 corresponds largely to the view according to FIG. 1. According to FIG. 7, the gear units 16 are accommodated in a housing 66, i.e., FIG. 7 corresponds to the actual installation state of the drive arrangements 10. Through the housing 66, the gear units 16 are protected against environmental influences and are able to reliably transmit the torque to the wheel 12. Holding elements or mounting elements for the gear units 16 can be formed or provided in the housing 66. The shape of the housing 66 is selected such that the inner walls (not shown) of the housing 66 have a spacing to the gear unit 16 as small as possible.

FIG. 8 shows a top view of cord-reinforced flexible joint device 34.

The cord-reinforced flexible joint device 34 according to this embodiment is configured in the form of a flexible coupling disc. The cord-reinforced flexible joint device 34 comprises a plurality of bushings 60*a*, which are accommodated in external bushings 60*b*. Collar elements 62 are provided at the axial ends of the external bushings 60*b*. The external bushings 60*b* and the collar elements 62 are embedded, at least in sections, in an elastic body 58.

The cord-reinforced flexible joint device 34 has a central opening O which extends in the direction of the center axis M through the cord-reinforced flexible joint device 34.

FIG. 9 shows a sectional view along the section line IX-IX in FIG. 8.

In FIG. 9, the cord packages 68a, 68b and 70 can be seen, which in pairs wrap around the external bushing 60b as well as the bushings 60a accommodated in the external bushings 60b. The two cord packages 68a and 68b have the same cross-section, which is smaller as the cross-section of the cord package 70. During operation of the cord-reinforced flexible joint device 34, the cord packages 68a and 68b are subjected to compressive load, whereas the cord package 70 is substantially subjected to tensile load during operation of the cord-reinforced flexible joint device 34. Same as the external bushings 60a and the collar elements 62, the cord packages 68a, 68b and 70 are likewise at least partially embedded in the elastic body 58.

The collar elements 62 are formed with an L-shaped cross-section and comprise a tubular section resting against the external bushing 60b as well as a section extending in the radial direction. The collar elements 62 serve for axially fixing of the cord packages 68a, 68b and 70 on the external bushing 60b. For this purpose, the collar elements 62 can be press-fitted onto the external bushings 60b, for example. The bushings 60a, in turn, are accommodated in the external bushings 60b.

The cord packages 68a, 68b and 70 wrap in pairs around the bushings 60a, 60b so that the cord packages 68a, 68b and 70 form a closed ring for torque transmission.

Figure 10:
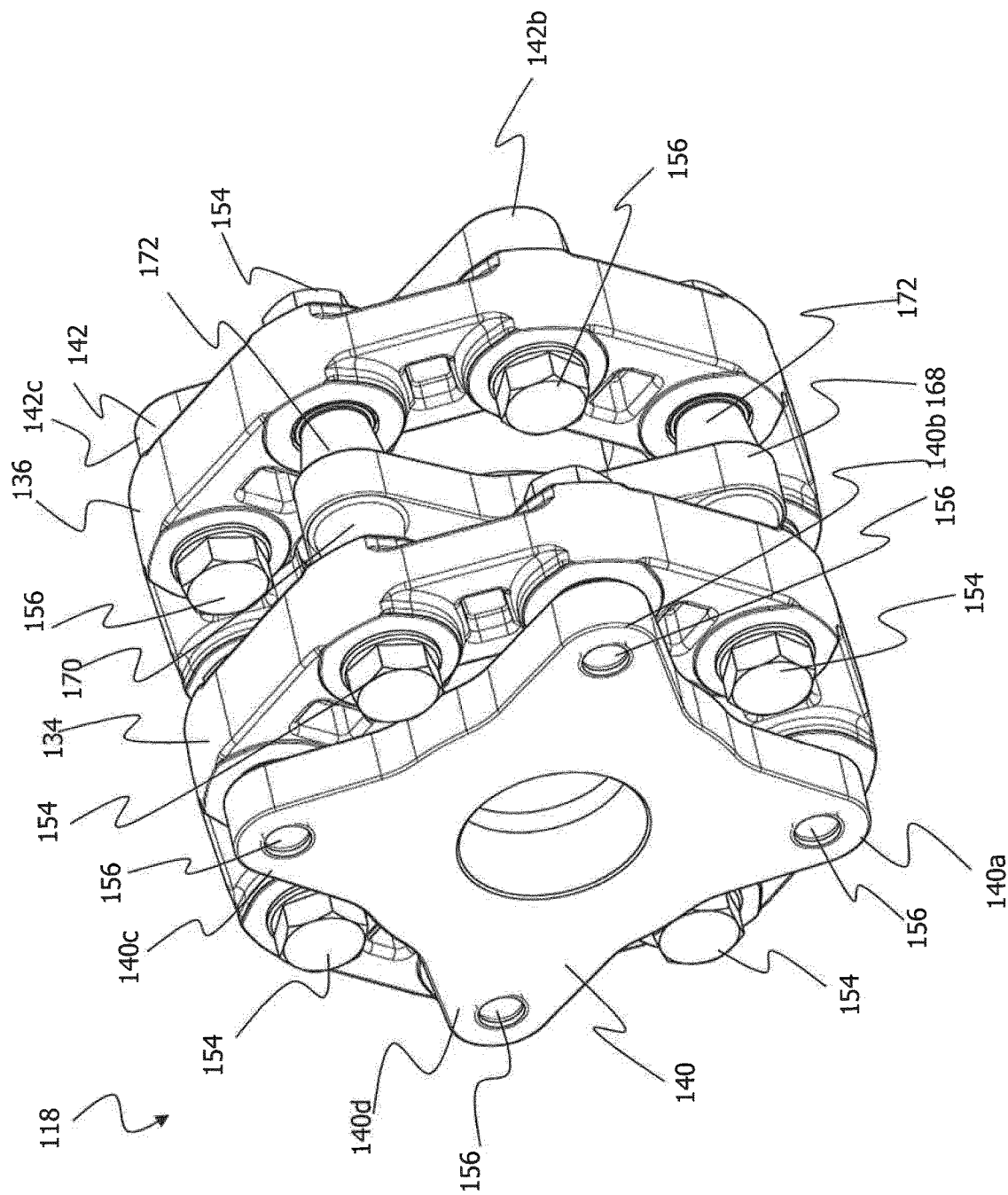
FIG. 10 shows a perspective view of a coupling device according to a second embodiment of the invention.

FIG. 10 shows a perspective view of a coupling device 118 according to a second embodiment of the invention.

The coupling device 118 has a first flange 140 and a second flange 142. The flanges 140, 142 are connected to the cord-reinforced flexible joint devices 134 and 136 via screws 156. According to this embodiment, the cord-reinforced flexible joint devices 134, 136 are each formed as a single flexible coupling body, i.e., as a flexible coupling disc. Such a flexible coupling body 134, 136 requires relatively little installation space in the axial direction. A disc-shaped connection element 168 that couples the cord-reinforced flexible joint devices 134, 135 to one another is provided between the cord-reinforced joint devices 134 and 136. The disc-shaped connection element 168 has connector pieces 170 and 172 for connecting to the cord-reinforced flexible joint devices 134 and 136. The connector pieces 170 serve for connecting to the flexible joint device 134. The connector pieces 172 serve for connecting to the flexible joint device 136. The cord-reinforced flexible joint devices 134 and 136 are connected to the disc-shaped connecting element 168 via the screws 154. For this purpose, the connector pieces 170, 172 rest with their axial end faces against the respective cord-reinforced flexible joint devices 134 and 136. The flange 140 has four connecting sections 140a, 140b, 140c and 140d which serve for connecting to the cord-reinforced flexible joint device 134 by means of the screws 156. Similarly, the flange 142 has four connecting sections of which only the connecting sections 142b and 142c are shown in FIG. 10.

Figure 11:
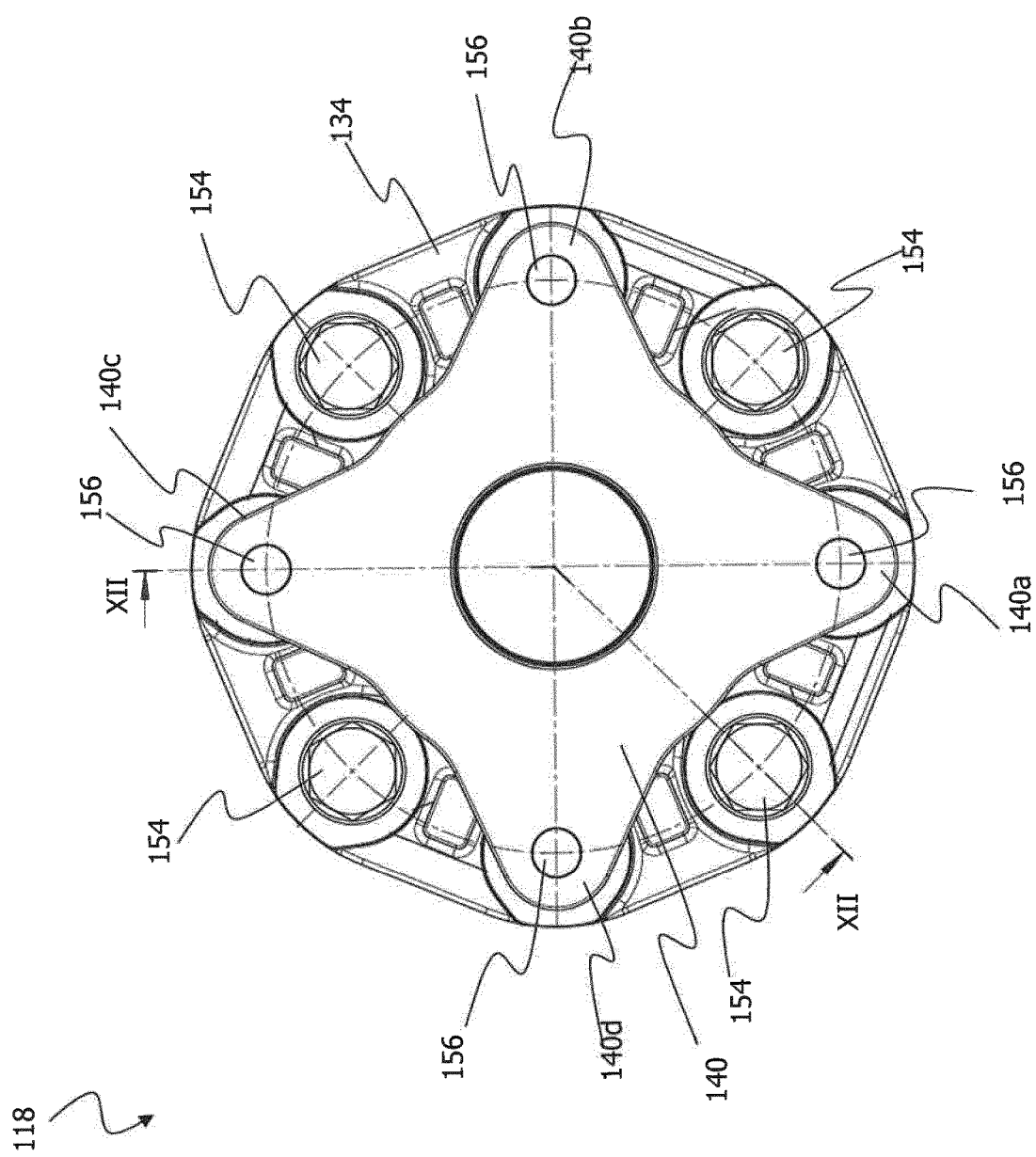
FIG. 11 shows a top view of the coupling device according to the second embodiment of the invention.

FIG. 11 shows a top view of the coupling device 118.

In FIG. 11, the first flange 140 with its four connecting sections 140a, 140b, 140c, 140d can be seen. The flange 140 is connected to the cord-reinforced flexible joint device 134 via screws 156. The cord-reinforced flexible joint device 134, in turn, is connected to the disc-shaped connection element, which is not shown in FIG. 11, via the screws 154.

Figure 12:
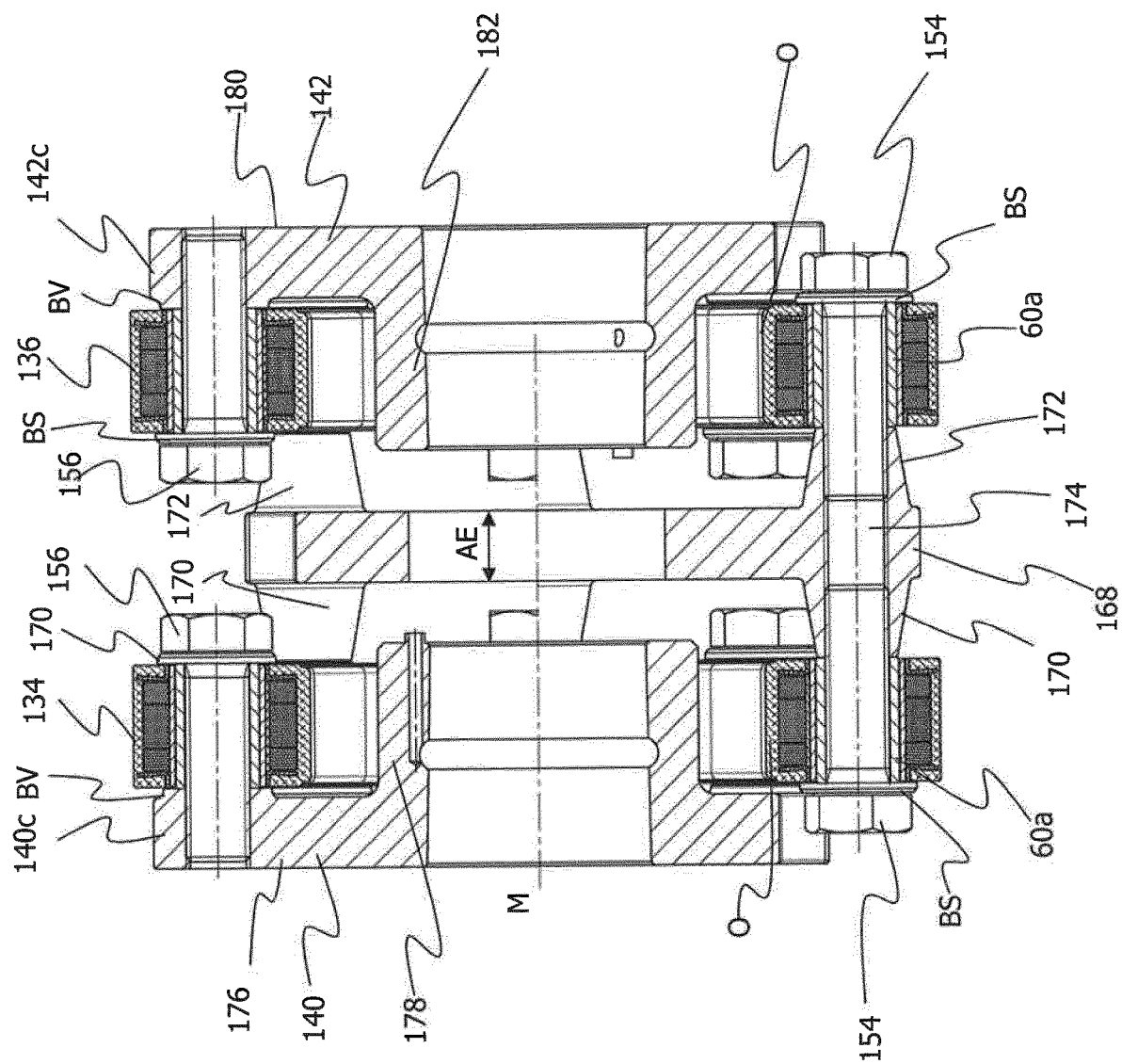
FIG. 12 shows a sectional view along the section line XII-XII in FIG. 11.

FIG. 12 shows a sectional view along the section line XII-XII in FIG. 11.

The flange 140 has a flange section 176 on which the connecting sections (only the connecting section 140c is shown in FIG. 12) are located. Besides the flange section 176, the flange 140 also comprises a tubular section 178 which extends in the direction of the center axis M. The pipe section 178 of the flange section 140 extends through the central opening O of the cord-reinforced flexible joint device 134.

The second flange 142 has a flange section 180 as well. The flange section 180 is provided with the connecting sections (only 142c is shown) and a pipe section 182. The pipe section 182 extends in the direction of the center axis M through the central opening O of the cord-reinforced flexible joint device 136. Accordingly, the cord-reinforced flexible joint devices 134 and 136 are arranged in the axial direction between the flange sections 176, 180 of the flanges 140 and 142.

The cord-reinforced flexible joint devices 134 and 136 are connected to one another via the disc-shaped connection element 168. The disc-shaped connecting element 168 comprises connector pieces 170 and 172 at its axial side surfaces. The connector pieces 170 rest with their end faces against the bushings 60a of the cord-reinforced flexible joint devices 134, 136. In other words, the bushing 60a of the cord-reinforced flexible joint devices 134, 136 are supported on the axial end faces of the connector pieces 170, 172. The cord-reinforced flexible joint devices 134, 136 are thus screwed by means of the screws 154 with the washers BS to the disc-shaped connection element 168 or are clamped between the screw head of the screws 154 and the washers BS and the axial end face of the connector pieces 170, 172. The disc-shaped connection element 168, as well as the flanges 140, 142, has four connecting sections for connecting to the cord-reinforced flexible joint devices 134 and 136.

A through-opening 174 extends through the connector pieces 170 and 172 as well as the plate-shaped connection element 168. The screws 154 for fastening the cord-reinforced flexible joint device 134 as well as the screws 154 for fastening the cord-reinforced flexible joint device 136 can be screwed into the through-opening 174.

The disc-shaped connection element 168 is formed and dimensioned such that it can be detached from the cord-reinforced flexible joint devices 134 and 136 and removed in the radial direction. Subsequently, the cord-reinforced flexible joint devices 134 and 136 can be detached from the first flange 140 and the second flange 142 and likewise removed in the radial direction. The radial removal of the connection element 168 and the flexible joint device 134 and 136 simplifies maintenance, assembly and disassembly of the coupling device 168 to a significant extent.

The extent of the disc-shaped connection element 168 corresponds substantially to the axial extent of the flange sections 176 and 180 of the flanges 140, 142. However, the axial extent AE of the disc-shaped connection element 168 in the axial direction is smaller than the axial extent of the cord-reinforced flexible joint devices 134 and 136. The disc-shaped connection element 168, however, can be dimensioned differently as long as the radial removability from the coupling device 118 is ensured.

The screws 156 serve for connecting the cord-reinforced flexible joint devices 134, 136 to the connection sections 140c, 142c of the flanges 140, 142. For fastening the cord-reinforced flexible joint devices 134 and 136, the flanges 140, 142 have at their connecting sections 140c, 142c fastening projections BV, against which the cord-reinforced flexible joint devices 134, 136 can rest with the bushings 60a and 60b. Accordingly, the cord-reinforced flexible joint devices 134, 136 are clamped between the screw heads 156 with the washers BS and the fastening projections BV.

The coupling device 118 is frequently employed on the drive side of a rail vehicle.

Figure 13:
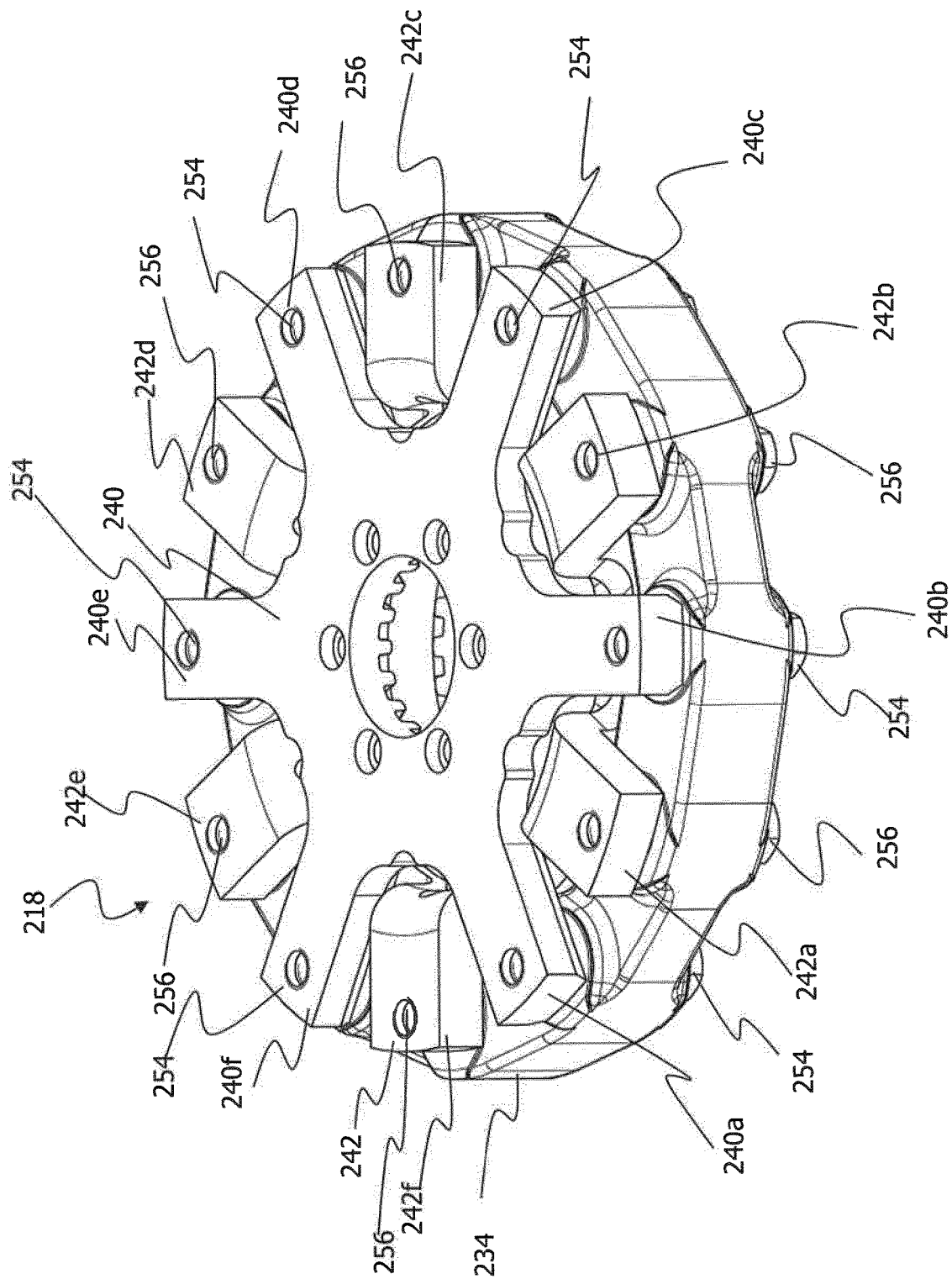
FIG. 13 shows a perspective view of a coupling device according to a third embodiment of the invention.

FIG. 13 shows a perspective view of a coupling device according to a third embodiment of the invention.

According to this embodiment, the first flange 240 and the second flange 242 are provided on the same axial side of the cord-reinforced flexible joint device 234. The first flange 240 has six flange arms 240*a* to 240*f*. Similarly, the second flange 242 has six flange arms 242*a* to 242*f*, which engage in each case between two flange arms 240*a* to 240*f* of the first flange 240. The flange arms 240*a* to 240*f* of the first flange 240 are screwed to the cord-reinforced flexible joint device 234 via the screws 254. The flange arms 242*a* to 242*f* of the second flange 242 are connected to the cord-reinforced flexible joint device 234 via the screws 256.

Figures 14, 15:
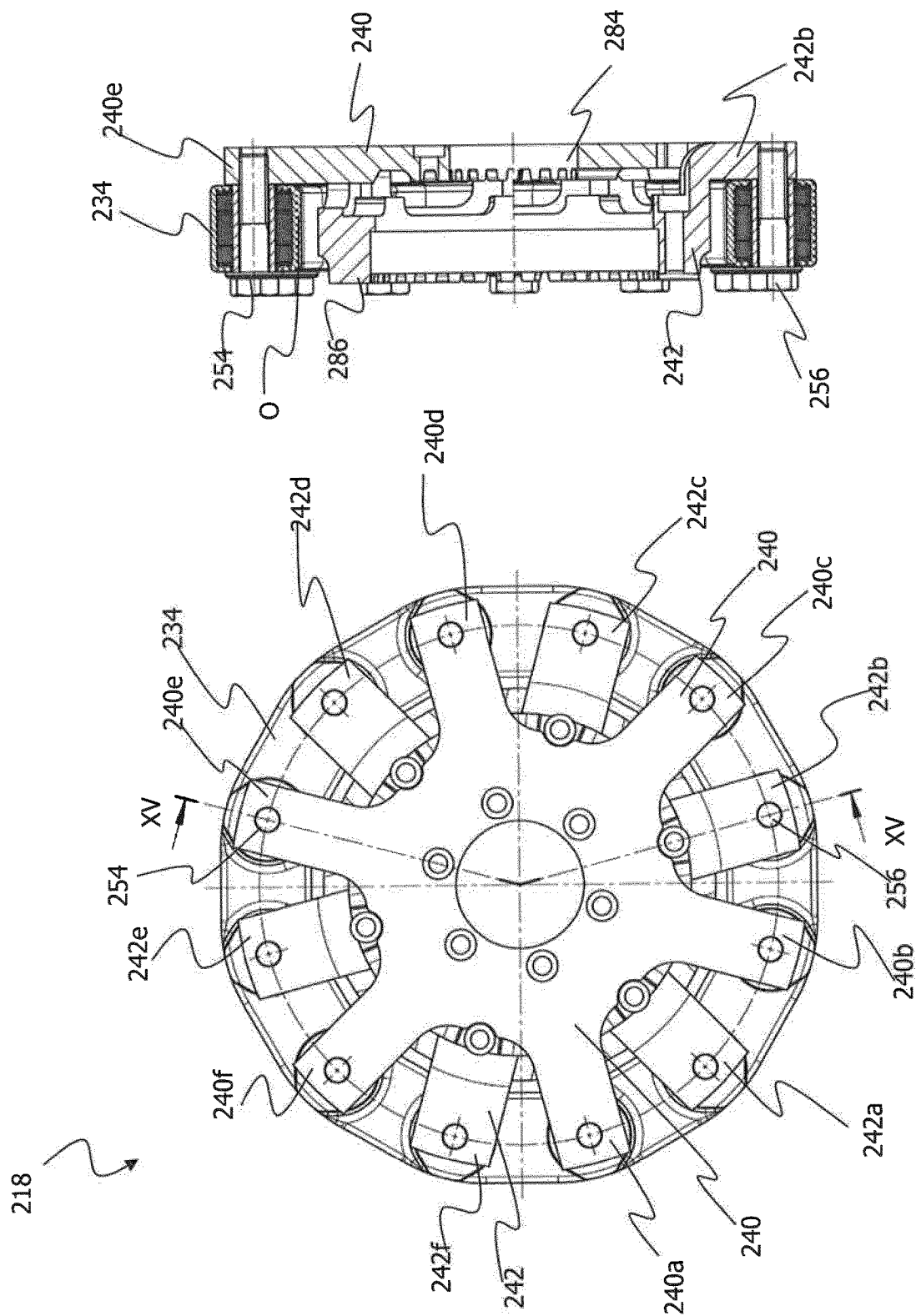
FIG. 14 shows a top view of the coupling device according to the third embodiment of the invention.
FIG. 15 shows a sectional view along the section line XV0XV in FIG. 15.

FIG. 14 shows a top view of the coupling device 218.

In FIG. 14, the flange arms 240*a* to 240*f* of the first flange 240 and the flange arms 242*a* to 242*f* of the second flange 242 can be seen again, which are screwed to the cord-reinforced flexible joint device 234 via the screws 254, 256.

FIG. 15 shows a sectional view along the section line XV-XV in FIG. 15.

The first flange 240 is formed substantially disc-shaped and has a central opening 284 with a toothing.

The second flange 242 extends with its tubular section 286 through the central opening O of the cord-reinforced flexible joint device 234. Starting from this tubular section 286, the arms 242*b* extend at an angle radially outwards so that they can be connected to the cord-reinforced flexible joint device 234.

The flange arm 242*b* is connected to the cord-reinforced flexible joint device 234 by means of the screw 256. The tubular section 286 of the second flange 242 also has a toothing for connecting to a shaft section or the like.

Figure 16:
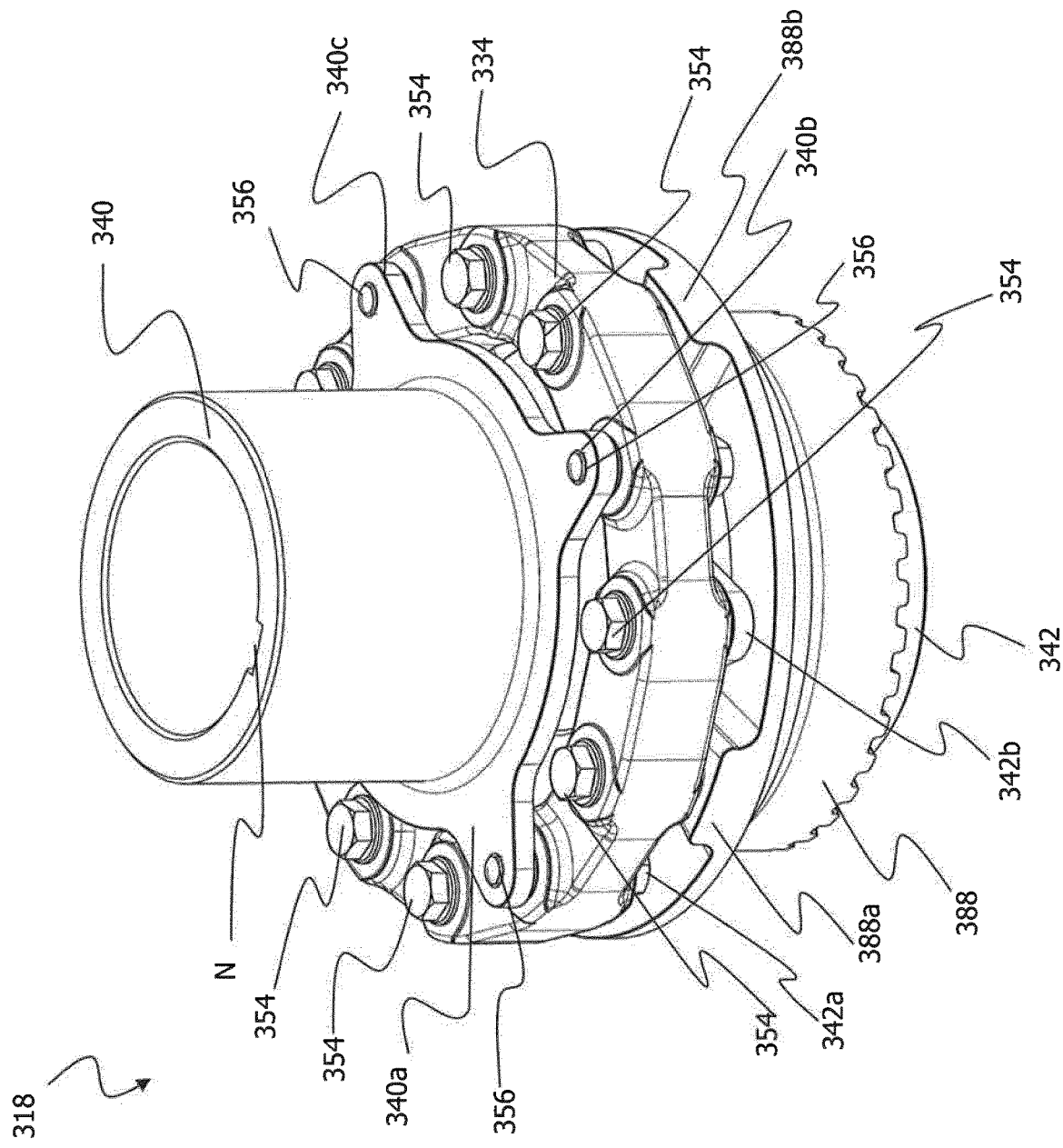
FIG. 16 shows a perspective view of a coupling device according to a fourth embodiment of the invention.

FIG. 16 shows a perspective view of a coupling device 318 according to a fourth embodiment of the invention.

According to this embodiment, the coupling device comprises, besides the first flange 340 and the second flange 342, an additional flange 388. The first flange 340 has four flange arms, of which the flange arms 340*a*, 340*b* and 340*c* are shown in FIG. 16. The flange arms 340*a*, 340*b* and 340*c* of the first flange 340 are screwed to the cord-reinforced flexible joint device 334 via the screws 356. The second flange 342 has flange arms as well, of which only the flange arm 342*b* can be seen in FIG. 16. The flange arm 342*b* is screwed to the cord-reinforced flexible joint device 343 via a screw 354. The additional flange 388 extends on the outside around the second flange 342 and has connecting sections 388*a* and 388*b* which are screwed to the cord-reinforced flexible joint device 334 via the screws 354. If, for example, the first flange 340 is driven, two drives can be driven with such a coupling device by means of the flanges 342 and 388.

The first flange 340 has a groove N extending in the axial direction for connecting to a shaft section that is not shown.

Figure 17:
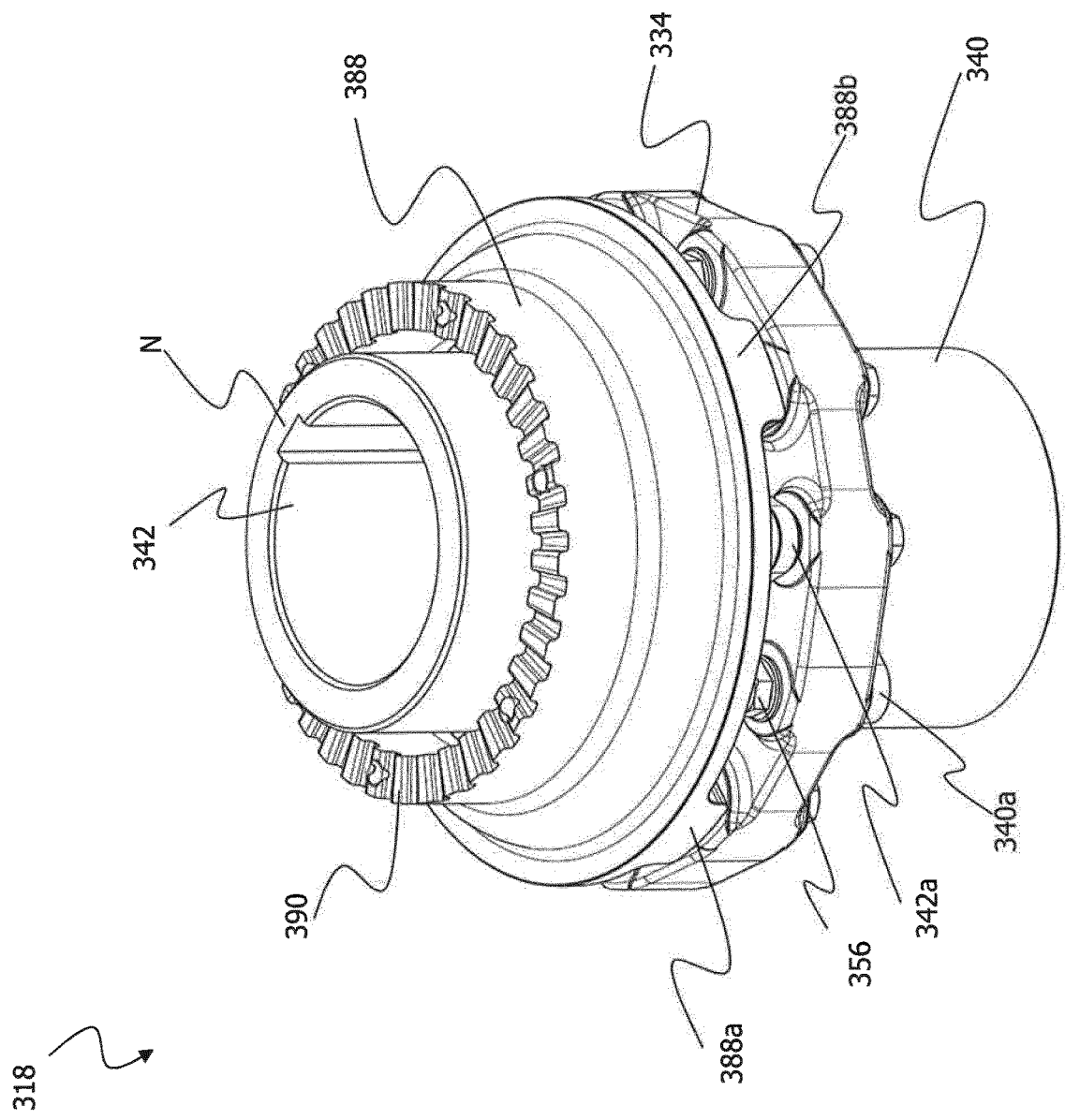
FIG. 17 shows another perspective view of the coupling device according to the fourth embodiment of the invention.

FIG. 17 shows another perspective view of the coupling device 318.

In FIG. 17 it can be seen, how the additional flange 388 surrounds the second flange 342, i.e., is arranged coaxial with the second flange 342. Similar to the first flange 340, the second flange has a groove N as well for connecting to a shaft section, which is not shown. The additional flange 388 has a toothing 390 provided on its end face for connecting to further components to be driven.

The second flange 342 and the further flange 388 are alternately screwed to the cord-reinforced flexible joint device 334 in the circumferential direction of the cord-reinforced flexible joint device 334. The first flange 340 is screwed with its flange arm 340*a* to the cord-reinforced flexible joint device 334. In the circumferential direction follow now a connecting section 342*a* of the second flange 342 and a connecting section 388*b* of the further flange 388 until a connecting section of the first flange 340 follows again.

Figure 18:
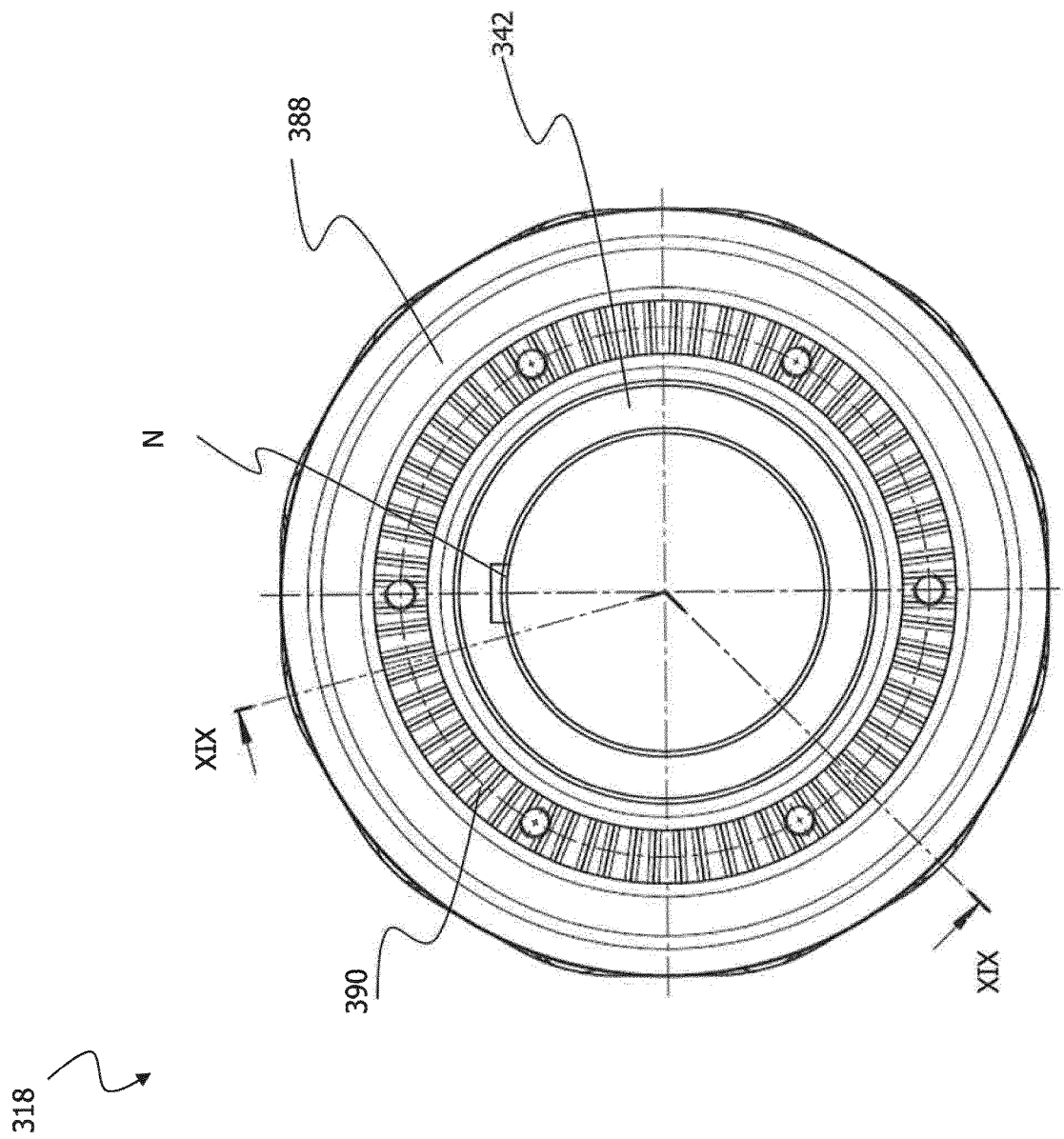
FIG. 18 shows a top view of the coupling device according to the fourth embodiment of the invention.

FIG. 18 shows a top view of the coupling device 318, in which the second flange 342 and the further flange 388 with its toothing 390 can be seen.

Figure 19:
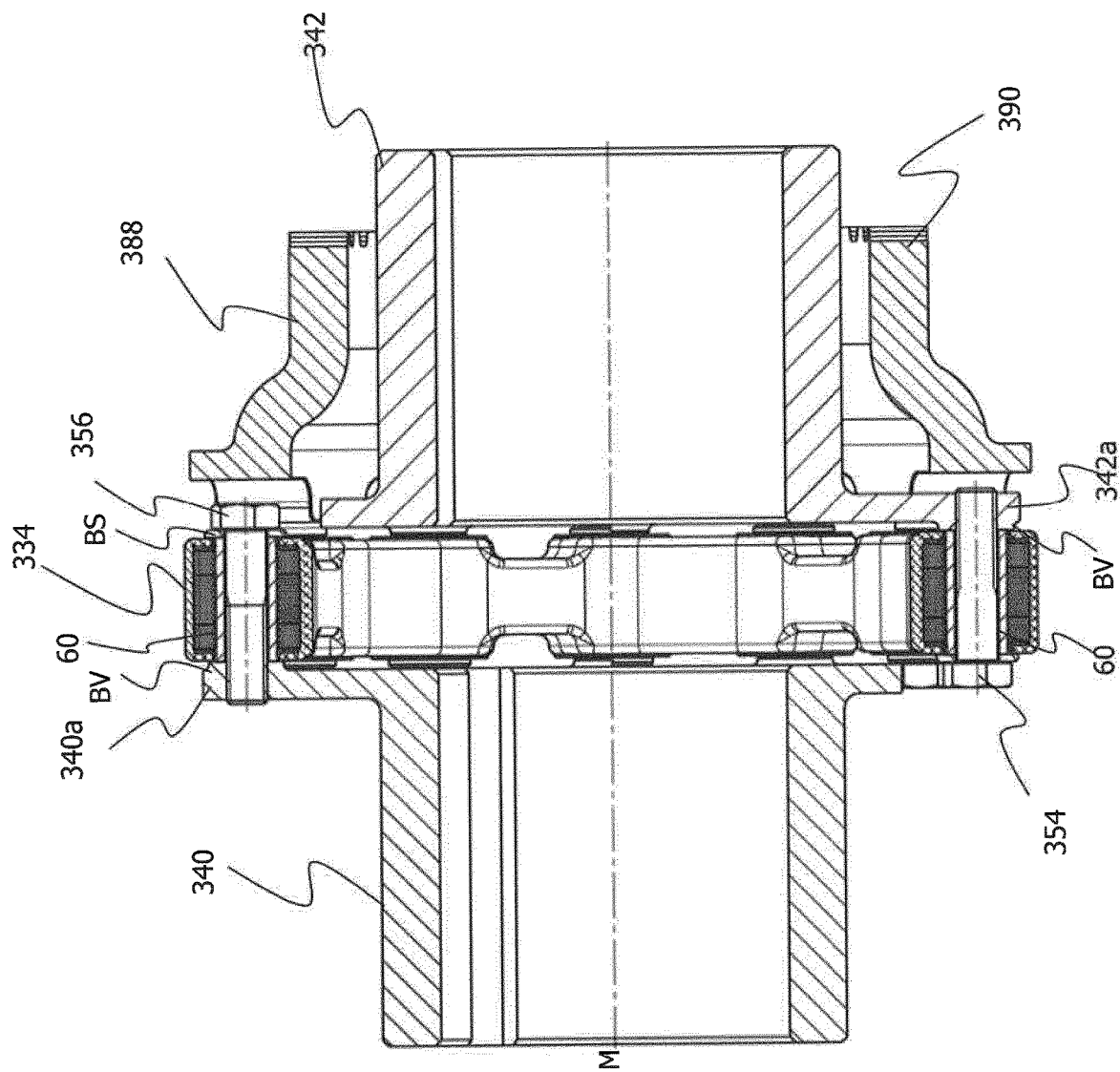
FIG. 19 shows a sectional view along the section line XIX-XIX in FIG. 18.

FIG. 19 shows a sectional view along the section line XIX-XIX in FIG. 18

The first flange 340 is screwed to the cord-reinforced flexible joint device 334 via the screws 356. Screwing takes place in the connecting section 340*a* of the first flange 340. For this purpose, fastening projections BV, against which the cord-reinforced flexible joint device 334 can rest with its bushings 60, are formed on the connecting section 340*a*. The bushings 60 of the cord-reinforced flexible joint device 334 thus are clamped between the screw heads of the screws 356 or the washers BS and the fastening projection BV.

The further flange 388 extends in the radial direction around the second flange 342.

Figure 20:
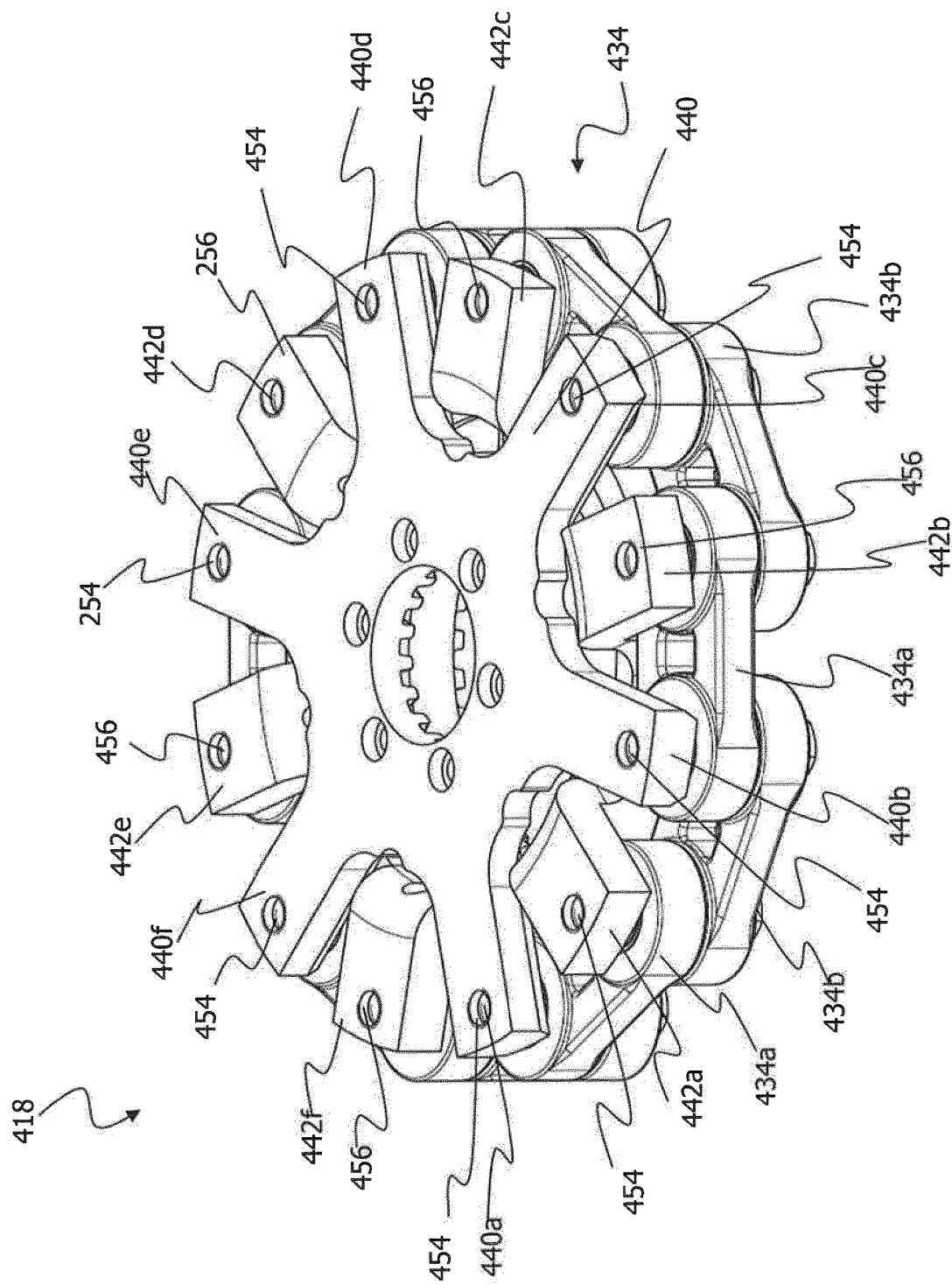
FIG. 20 shows a perspective view of a coupling device according to a fifth embodiment of the invention.

FIG. 20 shows a perspective view of a coupling device according to a fifth embodiment of the invention.

The fifth embodiment of the invention corresponds substantially to the third embodiment, which has been described with reference to the FIGS. 13 and 14.

The only substantial difference between these two embodiments is that the cord-reinforced flexible joint device 434 is not formed from an elastic body but rather is composed of a plurality of link-shaped connection elements 434*a* and 434*b*.

Each of the flange arms 440*a* to 440*f* and 442*a* to 442*f* is coupled by means of the screws 454 and 456 to in each case one link-shaped connection element 434*a* and a link-shaped connection element 434*b*. The flange arms 440*a* to 440*f* and 442*a* to 442*f* have a thread into which the screws 454 and 456 can be screwed.

FIG. 21 shows a top view of the coupling device 418.

FIG. 22 shows a sectional view along the section line XXII-XXII in FIG. 21.

In FIG. 22, the link-shaped connection elements 434*a* and 434*b* can be seen.

The link-shaped connection elements 434*a* and 434*b* each have a cord package 68 which is axially secured on the bushings 60 via collar elements 62. An internal bushing 92, which connects the two coupling elements 434*a* and 434*b* to one another, extends through the coupling elements 434*a*, 434*b* or the bushings 60 thereof. In each case two link-shaped coupling elements 434*a* and 434*b* are screwed via the screws 454 and 456 to one of the flange arms 442*e* and 440*c*, respectively, of the first flange 440 and the second flange 442, i.e., the bushings 60, 92 of the coupling elements 434*a* and 434*b* are clamped between the screws 454 with the washers BS and the respective flange arms 440*a* to 440*f*, 442*a* to 442*f*.

Figure 23:
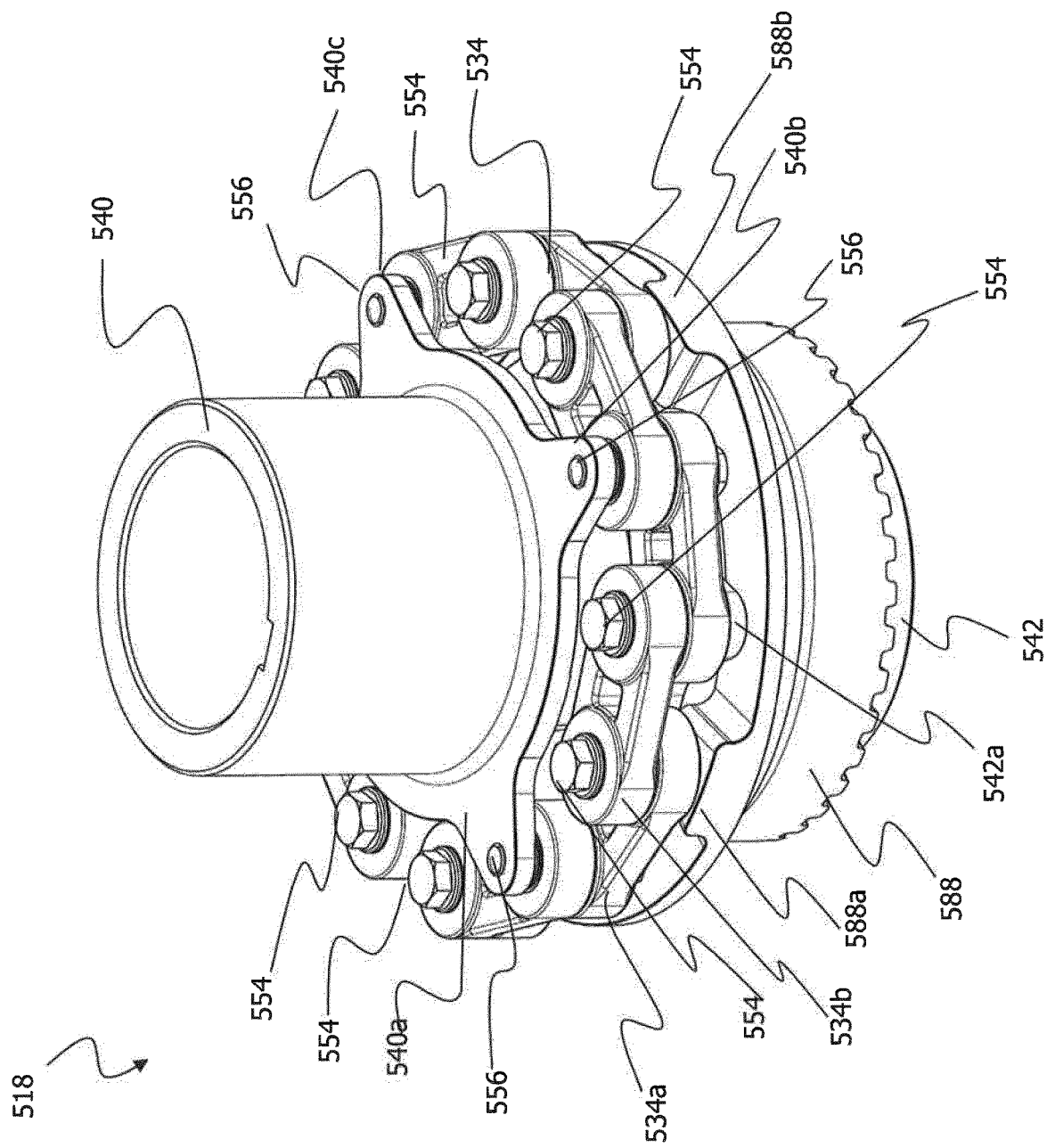
FIG. 23 shows a perspective view of a coupling device according to a sixth embodiment of the invention.

FIG. 23 shows a perspective view of a sixth embodiment of the invention.

The sixth embodiment corresponds largely to the fourth embodiment described with reference to the FIGS. 16 to 19.

The only difference between these two embodiments is that in this embodiment the cord-reinforced flexible joint device 534 is composed of a plurality of link-shaped coupling elements 534*a* and 534*b*.

Each of the flanges 540, 542 and 588 is screwed to a link-shaped coupling element 534a and a link-shaped coupling element 534b via the screws 554 and 556.

The link-shape coupling elements are identical to the coupling links 434a and 434b of the fifth embodiment of the invention.

Figure 24:
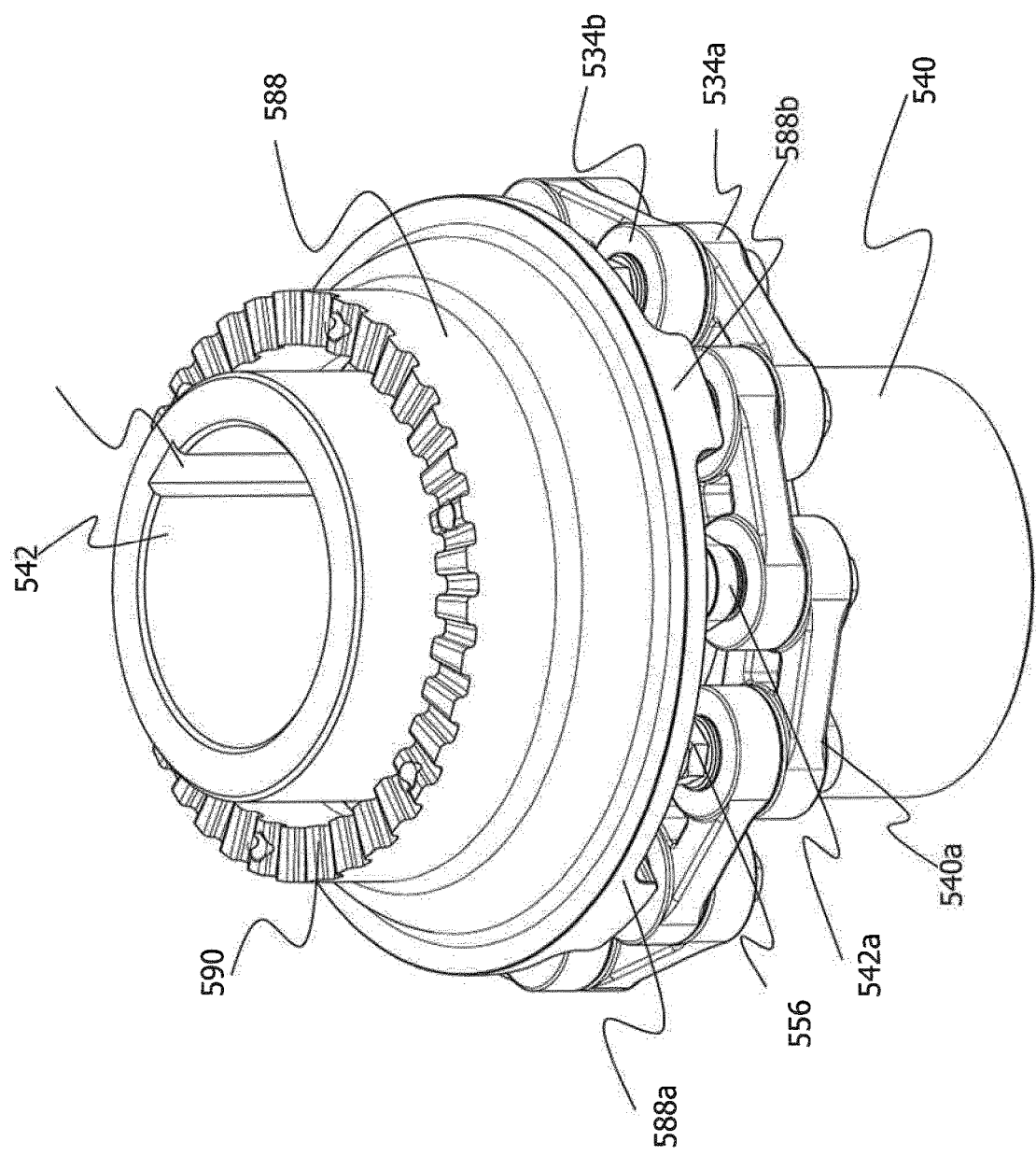
FIG. 24 shows another perspective view of the coupling device according to the sixth embodiment of the invention.

FIG. 24 shows another perspective view of the coupling device according to the sixth embodiment of the invention.

Figure 25:
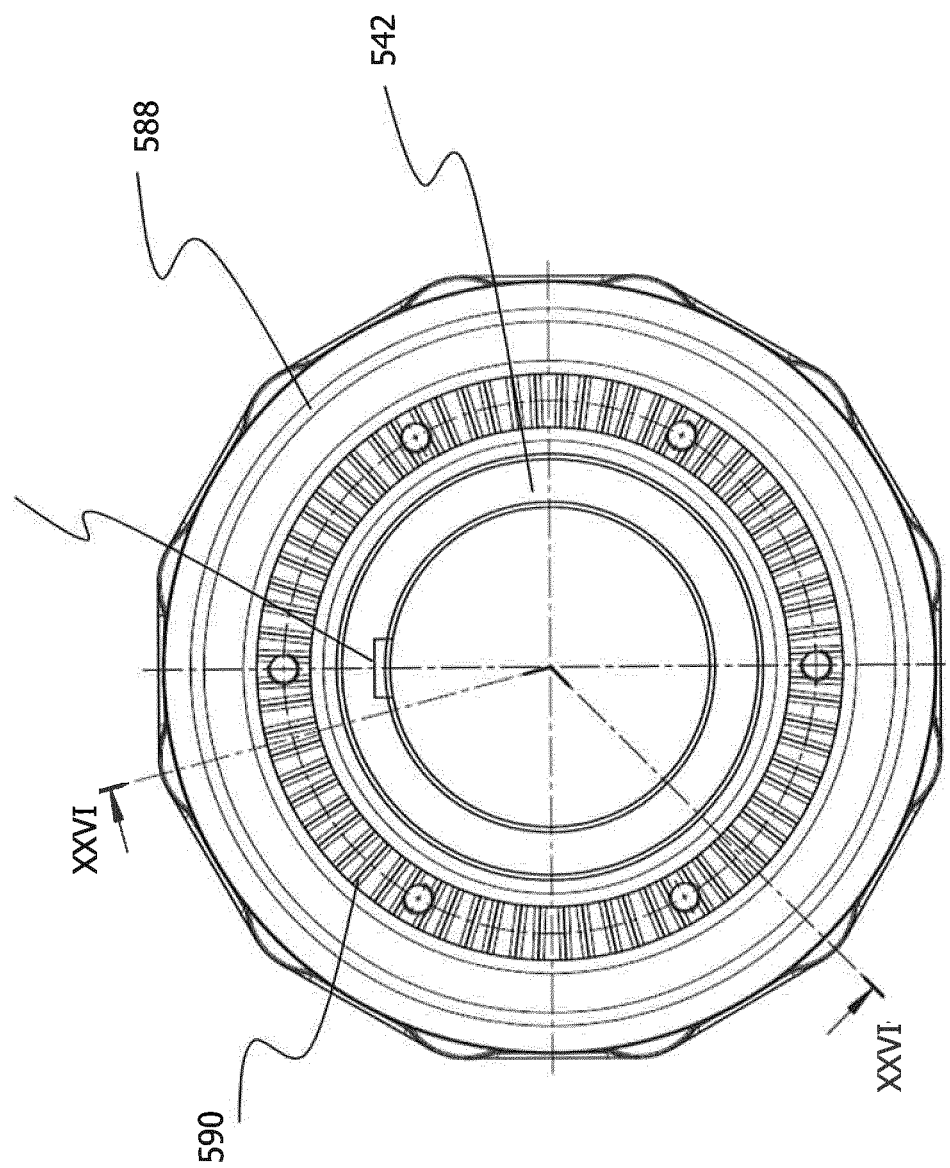
FIG. 25 shows a top view of the coupling device according to the sixth embodiment of the invention.

FIG. 25 shows a top view of the coupling device 518.

Figure 26:
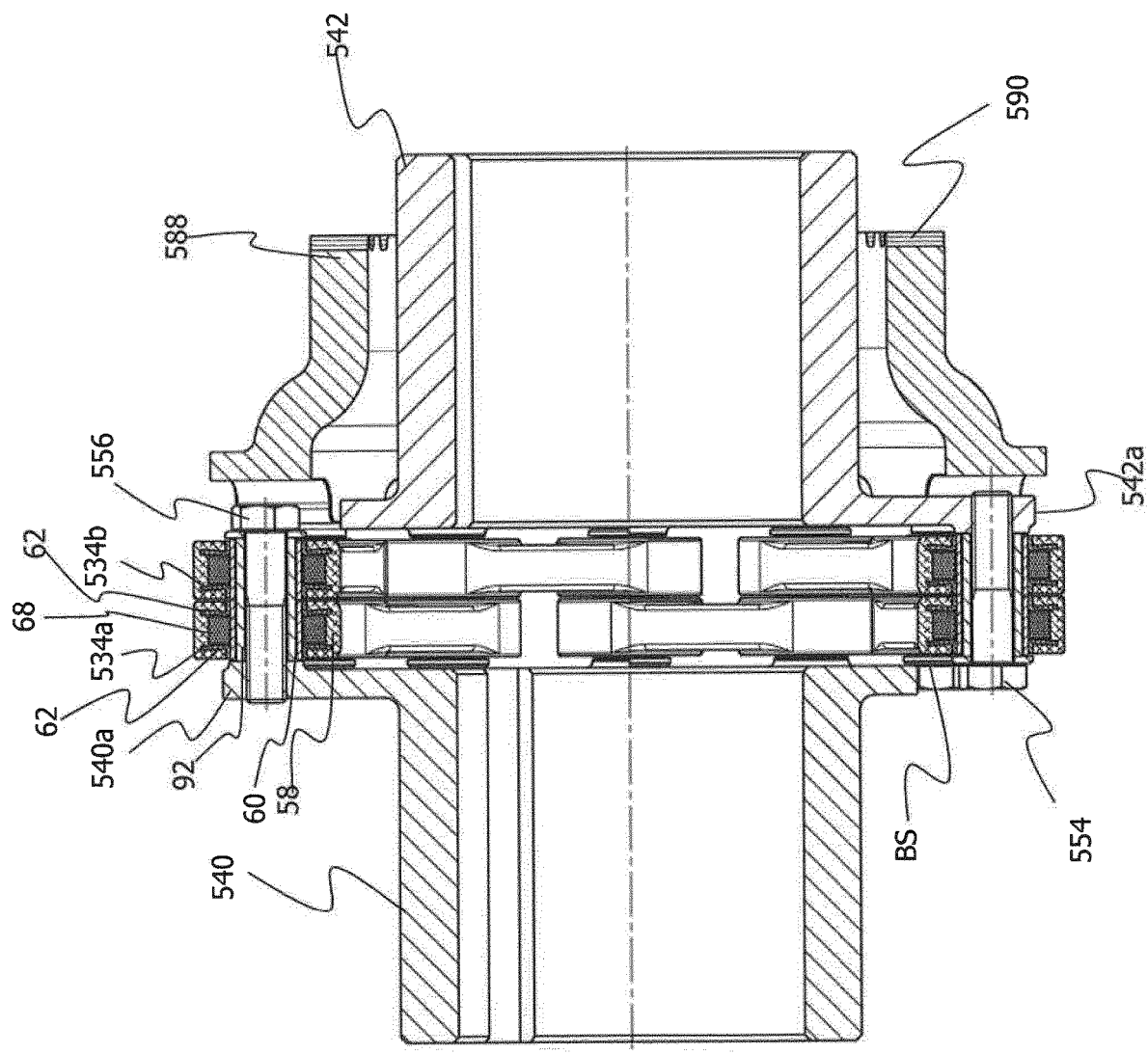
FIG. 26 shows a sectional view along the section line XXVI-XXVI in FIG. 25.

FIG. 26 shows a sectional view along the section line XXV-XXV in FIG. 25.

The link-shaped connection elements 534a and 534b each have a cord package 68 that is axially secured on the bushings 60 via the collar elements 62. An internal bushing 92, which connects the two coupling elements 534a and 534b to one another, extends through the coupling elements 534a, 534b or the bushings 60 thereof. In each case two link-shaped coupling elements 534a and 534b are screwed to the flanges 540, 542, 588 via the screws 554.

The invention claimed is:

1. A coupling device for connecting a motor to a gear unit of a vehicle, in particular a rail vehicle, comprising:
    at least one first cord-reinforced flexible joint device having an axial surface;
    at least one first flange that is associated with the motor and at least one second flange that is associated with the gear unit,
    wherein the at least one first flange and the at least one second flange are arranged on the axial surface of the at least one cord-reinforced flexible joint device,
    wherein the at least one cord-reinforced flexible joint device couples to one another the first flange associated with the motor and the second flange associated with the gear unit,
    wherein the at least one cord-reinforced flexible joint device is configured in the form of an elastic flexible coupling disc,
    wherein the elastic flexible coupling disc comprises:
        an elastic body;
        a plurality of linkage elements which are arranged in the circumferential direction in predetermined angular distances with respect to a center axis of the flexible joint device;
        a plurality of cord packages, wherein each cord package wraps around in each case two adjacent linkage elements and each linkage element is wrapped around by at least two cord packages; and
        a support device for axially guiding the plurality of the cord packages, which support device is arranged on at least one of the linkage elements,
        wherein the cord packages, the support devices and the linkage elements are at least partially embedded in the elastic body.

2. The coupling device according to claim 1, wherein at least one cord-reinforced flexible joint device is formed by a plurality of elastic bodies, each of which has at least one cord package.

3. The coupling device according to claim 1, wherein at least one cord-reinforced flexible joint device has a plurality of link-shaped cord packages which are arranged annularly and are connected to one another via at least one linkage element.

4. The coupling device according to claim 1, wherein at least one first cord-reinforced flexible joint device for coupling to at least one first flange that is associated with the motor and at least one second cord reinforced flexible joint device for coupling to the at least one second flange that is associated with the gear unit are arranged, wherein the at least one first cord-reinforced flexible joint device and the at least one second flexible joint device are connected to one another via at least one connection arrangement.

5. The coupling device according to claim 4, wherein at least one connection arrangement comprises at least one shaft section that extends between at least two connection flanges.

6. The coupling device according to claim 4, wherein the connection arrangement comprises at least one disc-shaped connection element that couples to one another the at least one first cord-reinforced flexible joint device and the at least one second cord-reinforced flexible joint device.

7. The coupling device according to claim 6, wherein at least one disc-shaped connection element extends perpendicular to the center axis M of the coupling device.

8. The coupling device according to claim 6, wherein at least one disc-shaped connection element has at least one connector piece for coupling to the at least one first cord-reinforced flexible joint device and the at least one second cord-reinforced flexible joint device.

9. The coupling device according to claim 4, wherein at least one connection flange arrangement has at least one spacer which sets a predetermined spacing between the at least one connection flange arrangement and at least one of the first and second cord-reinforced flexible joint devices.

10. The coupling device according to claim 1, further comprising a further flange is connected to the at least one cord-reinforced flexible joint device.

11. A drive arrangement for a rail vehicle, the drive arrangement comprising:
    at least one motor; and
    at least one gear unit that is associated with at least one vehicle wheel to be driven,
    wherein a coupling device is formed according to claim 1, which connects to one another a first flange associated with the at least one motor and a second flange associated with the at least one gear unit.

12. The drive arrangement according to claim 11, wherein the rotation axis of the at least one coupling device and the rotation axis of at least one gear unit input shaft extend substantially in the same direction.

13. The drive arrangement according to claim 11, wherein the drive arrangement has at least one holder on which an input shaft of the at least one gear unit is mounted.

14. The drive arrangement according to claim 11, wherein the drive arrangement is configured within a rail vehicle.

\* \* \* \* \*

UNITED STATES PATENT AND TRADEMARK OFFICE
CERTIFICATE OF CORRECTION

PATENT NO. : 10,670,081 B2  
APPLICATION NO. : 15/514186  
DATED : June 2, 2020  
INVENTOR(S) : Armin Huber et al.

Page 1 of 1

It is certified that error appears in the above-identified patent and that said Letters Patent is hereby corrected as shown below:

On the Title Page

In Item (72) (Name of Inventors), "Marc Brandt" is changed to "Marc Brandl."

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*